United States Patent
Amirghodsi et al.

(10) Patent No.: US 11,200,645 B2
(45) Date of Patent: Dec. 14, 2021

(54) PREVIEWING A CONTENT-AWARE FILL

(71) Applicant: Adobe Inc., San Jose, CA (US)

(72) Inventors: Sohrab Amirghodsi, Seattle, WA (US); Sarah Jane Stuckey, Petaluma, CA (US); Elya Shechtman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 11 days.

(21) Appl. No.: 16/878,182

(22) Filed: May 19, 2020

(65) Prior Publication Data

US 2020/0279355 A1    Sep. 3, 2020

Related U.S. Application Data

(63) Continuation of application No. 15/921,447, filed on Mar. 14, 2018, now Pat. No. 10,706,509.

(51) Int. Cl.
*G06T 11/60*     (2006.01)
*G06T 5/20*      (2006.01)
(Continued)

(52) U.S. Cl.
CPC ............ *G06T 5/005* (2013.01); *G06T 3/0006* (2013.01); *G06T 5/009* (2013.01); *G06T 5/20* (2013.01);
(Continued)

(58) Field of Classification Search
CPC ....... G06T 5/005; G06T 3/0006; G06T 5/009; G06T 5/20; G06T 11/60;
(Continued)

(56) References Cited

U.S. PATENT DOCUMENTS 5,363,318 A    11/1994   McCauley
6,840,933 B1    1/2005   Pang et al.
(Continued)

OTHER PUBLICATIONS

Removing Objects with Content-Aware Fill and Patch in Photoshop CC (Oct. 7, 2014). Planet Photoshop. 7 pages.
(Continued)

*Primary Examiner* — Ming Y Hon
(74) *Attorney, Agent, or Firm* — Shook, Hardy & Bacon L.L.P.

(57) ABSTRACT

Embodiments of the present invention provide systems, methods, and computer storage media for automatically synthesizing a content-aware fill using similarity transformed patches. A user interface receives a user-specified hole and a user-specified sampling region, both of which may be stored in a constraint mask. A brush tool can be used to interactively brush the sampling region and modify the constraint mask. The mask is passed to a patch-based synthesizer configured to synthesize the fill using similarity transformed patches sampled from the sampling region. Fill properties such as similarity transform parameters can be set to control the manner in which the fill is synthesized. A live preview can be provided with gradual updates of the synthesized fill prior to completion. Once a fill has been synthesized, the user interface presents the original image, replacing the hole with the synthesized fill.

20 Claims, 16 Drawing Sheets

(51) Int. Cl.
*G06T 3/00* (2006.01)
*G06T 5/00* (2006.01)

(52) U.S. Cl.
CPC .......... *G06T 11/60* (2013.01); *G06T 2200/24* (2013.01); *G06T 2207/20104* (2013.01); *G06T 2207/20208* (2013.01); *G06T 2207/20221* (2013.01)

(58) Field of Classification Search
CPC . G06T 2207/20208; G06T 2207/20104; G06T 2200/24; G06T 2207/20221
See application file for complete search history.

(56) References Cited

U.S. PATENT DOCUMENTS

| | | | |
|---|---|---|---|
| 7,044,602 B2 | 5/2006 | Chernyak | |
| 8,355,083 B2* | 1/2013 | Keiser | H04N 5/2224 348/559 |
| 8,625,927 B2 | 1/2014 | Shechtman et al. | |
| 8,761,457 B1 | 6/2014 | Seitz et al. | |
| 8,811,749 B1 | 8/2014 | Barnes et al. | |
| 8,818,135 B1* | 8/2014 | Goldman | G06T 5/005 382/299 |
| 2003/0112704 A1 | 6/2003 | Goff et al. | |
| 2005/0002570 A1 | 1/2005 | Clark et al. | |
| 2005/0232510 A1 | 10/2005 | Blake et al. | |
| 2007/0176929 A1 | 8/2007 | Grabli et al. | |
| 2010/0260390 A1 | 10/2010 | Liang et al. | |
| 2012/0230564 A1 | 9/2012 | Liu et al. | |
| 2013/0051685 A1* | 2/2013 | Shechtman | G06K 9/4652 382/218 |
| 2013/0148912 A1 | 6/2013 | Chong | |
| 2013/0163874 A1 | 6/2013 | Shechtman et al. | |
| 2013/0266198 A1 | 10/2013 | Pereira et al. | |
| 2014/0169451 A1 | 6/2014 | Cohen et al. | |
| 2014/0169700 A1 | 6/2014 | Liu et al. | |
| 2015/0097827 A1* | 4/2015 | Cohen | G06T 5/005 345/420 |
| 2015/0235399 A1* | 8/2015 | Shechtman | G06T 5/005 345/639 |
| 2015/0248584 A1 | 9/2015 | Greveson et al. | |
| 2015/0278986 A1* | 10/2015 | Edwin | G06T 3/4023 345/428 |
| 2016/0335519 A1 | 11/2016 | Wagner et al. | |
| 2017/0046833 A1 | 2/2017 | Lurie et al. | |
| 2017/0140514 A1* | 5/2017 | Amirghodsi | G06T 11/001 |
| 2017/0221243 A1* | 8/2017 | Bedi | G06T 5/005 |
| 2017/0345193 A1* | 11/2017 | Peterson | G06T 11/60 |
| 2018/0055355 A1 | 3/2018 | Sarunic et al. | |
| 2018/0144458 A1 | 5/2018 | Xu et al. | |

OTHER PUBLICATIONS

Barnes, C., Shechtman, E., Finkelstein, A., & Goldman, D. B. (2009). PatchMatch: A randomized correspondence algorithm for structural image 1 editing. ACM Transactions on Graphics-TOG, 28(3), 24.

Snir, M. (2005). Wavefront. Parallel Programming Patterns University of Illinois at Urbana-Champaign. Department of 2 Computer Science. 5 pages.

Intel Corporation. Wavefront. In Intel Thread Building Blocks (Intel TBB) Developer Guide. Retrieved from the Internet Mar. 9, 2018 at <https://www.threadingbuildingblocks.Org/docs/help/hh_goto.htm9index.htm#tbb_userguide/3esign_Patterns/Wavefront.html>. 3 pages.

* cited by examiner

BEFORE

AFTER

PREVIEWING A CONTENT-AWARE FILL

CROSS-REFERENCE TO RELATED APPLICATIONS

This application is a Continuation of U.S. patent application Ser. No. 15/921,447 filed Mar. 14, 2018 and titled INTERACTIVE SYSTEM FOR AUTOMATICALLY SYNTHESIZING A CONTENT-AWARE FILL, the entire contents of which are incorporated by reference herein.

BACKGROUND

When editing images, a user may desire to remove an unwanted object from an image. For example, a photograph may include an unwanted subject, visual artifacts such as those resulting from damage or digital effects, and the like. However, simply deleting an unwanted region leaves a hole in the image. Some digital image processing tools can automatically fill the hole with translated patches sampled from other regions of the image. For example, some tools use a randomized algorithm to identify approximate nearest neighbor matches between image patches. As such, some tools can construct a composite fill from the translated image patches. In this manner, users can automatically fill in missing parts of an image.

SUMMARY

Embodiments of the present invention are directed to an interactive system for automatically synthesizing a content-aware fill using similarity transformed patches. The interactive system includes a user interface which allows a user to specify a hole and a sampling region to use to fill the hole. The user interface is configured to present the original image with an overlay indicating the sampling region of the original image. A brush tool can be provided to facilitate a user input adding to or subtracting from the sampling region. The sampling region can be stored in a constraint mask that identifies the sampling region. Upon detecting completion of the user input, the interactive system can automatically pass the resulting constraint mask to a patch-based synthesizer configured to synthesize a fill using similarity transformed patches sampled from the sampling region specified by the constraint mask. In some embodiments, the user interface can present a preview of what the fill will look like prior to completion. The preview can be a live preview providing gradual updates of the fill generated by the patch-based synthesizer. Once a fill has been synthesized, the user interface presents the original image, replacing the hole with the synthesized fill.

In some embodiments, the user interface can facilitate a user input specifying one or more fill properties, such as similarity transform parameters (e.g., parameters specifying or otherwise indicating valid ranges for rotations, scaling factor, mirroring and/or translations of candidate patches), color adaption (e.g., gain and/or bias), deterministic fill synthesis, and the like. The fill properties can be set to control the manner in which the patch-based synthesizer synthesizes the fill.

In some embodiments, the patch-based synthesizer can utilize an improved patch validity test to validate candidate patches as valid patches falling within the designated sampling region. A hole dilation test for patch validity can be performed by dilating the hole in the sampling region to generate a reduced sampling region, and by performing a lookup to determine whether a representative pixel in the patch (e.g., the center pixel) falls within the reduced sampling region. A patch which passes this test is designated valid. A no-dilation test for patch invalidity can be performed by looking up whether a representative pixel of a patch (e.g., the center pixel) falls within the hole. A patch which satisfies this criteria is designated invalid. A comprehensive pixel test for patch validity can be performed by looking up whether each pixel in the patch falls within the sampling region. Advantageously, only those patches whose validity cannot be determined using either of the former two tests are evaluating using the comprehensive pixel test. A patch whose pixels pass the comprehensive pixel test is designated valid, while a patch whose pixels fail the comprehensive pixel test is designated invalid. In some embodiments, a fringe test for range invalidity can be performed as a precursor to any or all of the improved patch validity tests. The fringe test can be performed by adding a fringe indicating an invalid range to the boundary of the source image. Range invalidity for a particular pixel can be determined by looking up whether the pixel falls within the fringe. A patch with a pixel with an invalid range is designated as an invalid patch. Generally, the patch-based synthesizer uses validated patches to synthesize the fill.

As such, using implementations described herein, a user can efficiently and effectively synthesize content-aware fills.

BRIEF DESCRIPTION OF THE DRAWINGS

The present invention is described in detail below with reference to the attached drawing figures, wherein:

FIG. 6A depicts an original image with a constraint mask overlay; FIG. 6B is an example image with an automatically synthesized content-aware fill with mirroring off and color adaptation on; FIG. 6C is an example image an automatically synthesized content-aware fill with mirroring on and color adaptation off;

DETAILED DESCRIPTION

Overview

Oftentimes during photo editing, a user may desire to remove an unwanted object from an image. One conventional tool to accomplish this is a content-aware fill ("CAF") tool. Generally, a CAF tool might allow the user to select, highlight, draw or otherwise indicate an unwanted region of the image. Conventional content-aware fill techniques remove the unwanted region and automatically fill the resulting hole using samples from other parts of the image. A CAF algorithm seeks to approximately reconstruct a target image (e.g., the hole) by rearranging and piecing together (with overlaps) small, square patches of pixels from a source image (e.g., a sampling region). CAF seeks to identify an approximate matching patch (i.e., the nearest neighbor) from the sampling region for each patch of a target image (i.e., the hole to fill). Candidate patches from the source image are selected, tested, and refined in an iterative manner. The resulting reconstruction can fill the hole in the way that makes it look like the unwanted object was never there.

However, conventional content-aware fill tools suffer from various drawbacks. For example, conventional CAF techniques are limited in the manner by which candidate patches are identified. Conventional techniques search for candidate patches over a continuous translation domain, and candidate patches are identified by the 2D translation that maps a patch in the target image (hole) to the corresponding candidate patch in the source image (sampling region). By limiting candidate patches to 2D translations, the potential quality of the reconstructed target image is limited. However, CAF techniques are already computationally expensive, and simply expanding the search domain results in an unacceptable increase in computation time. As such, there is a need for improved image completion quality with reduced computational demands.

Figure 1:
FIG. 1 is an example image, before and after applying a conventional content-aware fill.
Figure 1:

Moreover, in a substantial number of cases, the hole is filled with the wrong image content, producing an awkward and unnatural result. FIG. 1 illustrates this issue. FIG. 1 depicts an example image of a flower with a bee collecting pollen, before and after applying a conventional content-aware fill technique. To remove the bee from the image, a user might specify boundary 110 surrounding the bee to identify a hole enclosed by boundary 110 as the region to fill. As will be appreciated, the generated fill in region 120 is inaccurate. For example, the texture of the flower petals is inconsistent and blurred, and some parts of the hole were incorrectly filled with the green background. This result is obviously undesirable.

Many users find these results particularly frustrating considering other limitations of conventional CAF techniques. For example, there are currently no ways for users to identify a sampling region or to control parameters of the search domain. Moreover, conventional content-aware fills are not deterministic, often resulting in structurally different fills from run to run. As a result, conventional techniques often do not produce an accurate preview. In practice, users would simply repeat the process, generating multiple fills until achieving a desired result. Considering the computationally expensive nature of the conventional CAF, this repetitive process is time-consuming and frustrating. As such, there is a need for an improved user interface to facilitate a more efficient user experience.

Accordingly, embodiments of the present invention are directed to an interactive system for automatically synthesizing a content-aware fill. The interactive system includes a user interface which allows a user to specify a hole and a sampling region to use to fill the hole. The sampling region, which generally excludes the hole, can be stored in a constraint mask. A brush tool can facilitate a user input adding to or subtracting from the sampling region. Upon detecting completion of the user input, the interactive system can automatically pass the resulting constraint mask to a back end content-aware fill engine to synthesize a content-aware fill using the specified constraint mask. Additionally and/or alternatively, the user interface can facilitate a user input specifying one or more fill properties for a content-aware fill, such as rotation adaptation, scaling, mirroring, color adaptation, and/or deterministic fill. In some embodiments, the user interface can include a results panel that includes a preview of what the fill will look like prior to completion. The preview can be a live preview providing gradual updates of the fill generated by the content-aware fill engine. As explained in more detail below, a preview can be generated and/or updated after an iteration (e.g., after each iteration) of a patch-based synthesizer process.

Some embodiments disclosed herein are directed to an improved patch validity test for patch-based synthesis applications. The introduction of patch rotations and scaling increases the complexity of determining whether a candidate patch is a valid patch falling within the sampling region. To test the validity of a given patch comprising multiple pixels, one or more of a series of simplified tests can be performed to determine whether each pixel of the patch falls within the sampling region (e.g., designated by a constraint mask). A hole dilation test for patch validity can be performed by dilating the hole in the constraint mask to generate a reduced constraint mask, and by performing a lookup to determine whether a representative pixel in the patch falls within the region designated by the reduced constraint mask. A patch which passes this test is valid. A no-dilation test for patch invalidity can be performed by looking up whether a representative pixel of a patch falls within the hole (e.g., falls outside of the sampling region designated by the constraint mask). A patch which satisfies this criteria is invalid. A comprehensive pixel test for patch validity can be performed by looking up whether each pixel in the patch falls within the sampling region designated by the constraint mask. Due to the relatively larger computational demands of this comprehensive pixel test, advantageously, only those patches whose validity cannot be determined using either of the other two tests are tested with the comprehensive pixel test. A patch whose pixels pass the comprehensive test is valid. One or more of the patch validity tests can be incorporated into the interactive system for automatically synthesizing a content-aware fill.

In some embodiments, one or more of the patch validity tests can be enhanced by using a fringe test for range invalidity. Sometimes a candidate patch can be generated with one or more pixels with invalid coordinates falling outside of an image, for example, due to the introduction of patch rotations. However, when accessing a data structure (e.g., to lookup whether a particular pixel falls within a mask), the access must be valid and within the allocated block of memory for that structure. Conventionally, conditional range tests are performed to determine whether each pixel to be tested has a valid range. In some embodiments, conditional range tests can be replaced with a fringe test for range invalidity. The fringe test can be performed by adding a fringe to the boundary of the image indicating an invalid range. As such, range invalidity for a particular pixel under test can be determined by looking up whether the pixel falls within the fringe. In some embodiments, the fringe can be added as an invalid region to a mask such as the constraint mask. Advantageously, the fringe test for range invalidity is performed as a precursor to each patch validity test.

As such, using implementations described herein, a user can efficiently and effectively synthesize content-aware fills. Among the improvements over conventional techniques, the front end user interface allows a user to customize a sampling region and fill properties to optimize a content-aware fill based on image content. A live preview provides gradually updating results, providing a user with quick, real-time feedback and an earlier opportunity to make changes and arrive at a desired fill. The back end content-aware fill engine provides expanded support for similarity transforms, thereby improving fill quality. Improved patch validity tests significantly reduce the computational complexity required to support this expanded functionality. These techniques can be used to synthesize better, faster fills.

Having briefly described an overview of aspects of the present invention, various terms used throughout this description are provided. Although more details regarding various terms are provided throughout this description, general descriptions of some terms are included below to provider a clearer understanding of the ideas disclosed herein:

Patch synthesis—Some digital image processing tools can automatically synthesize a target image from patches sampled from other regions of the image. Generally, patch synthesis refers to this reconstruction of a target image from patches sampled from a source image. In the context of hole filling, the target image to be synthesized can be a hole in an image, and the source image—or sampling region—can be the rest of the image, or some portion thereof. One particular patch synthesis technique uses a randomized algorithm to identify approximate nearest neighbor matches between image patches and constructs a composite fill from the identified image patches. Such techniques for identifying approximate nearest neighbor matches are also known as patch matching, and the resulting composite fill is also known as a content-aware fill.

Hole—Sometimes, a photograph or other image includes some unwanted object, such as an unwanted subject, visual artifacts such as those resulting from damage or digital effects, and the like. However, simply deleting an unwanted region would leave a hole in the image. As used herein, "hole" can refer to the region of the image to be filled, regardless of whether the region has actually been deleted. Similarly, "hole" can refer to a corresponding invalid sampling region in a mask such as a constraint mask.

Mask—As used herein, a mask is one or more data structures that identify and/or designate certain pixels for a particular use. For example, a mask can be initialized with the same dimensions as an original image to be edited. The mask can identify pixels in a hole to be filled, pixels in a valid sampling region, pixels in a reduced region, pixels in a fringe, and the like. In one example, a user selection can be used to generate a constraint mask designating a valid sampling region in an image. In one implementation, the constraint mask can encode a state for each pixel, such as pixels in a valid sampling region (e.g., using an arbitrary number such as 1, the value of the pixel, etc.), pixels in an invalid sampling region (e.g., 0), pixels in a hole, pixels in a user-specified constraint, etc. Other variations will be understood by those of ordinary skill in the art.

Similarity transform—Generally, a similarity transform is a shape-preserving transform that can include one or more translation, rotation, scaling and/or reflection (i.e., mirroring).

Image pyramid—An image pyramid will be understood as a multi-scale representation of an image. An original image is subsampled to produce a smaller, lower (courser) resolution image. This resulting image is itself subsampled to produce yet another smaller, lower resolution image. This process can be repeated to produce multiple representations of different scales. If the images were stacked with the smaller, lower resolution scales on top and the larger, higher resolution scales on the bottom, the resulting multi-scale collection would resemble a pyramid.

Exemplary Automated Patch Synthesis Environment

Figure 2:
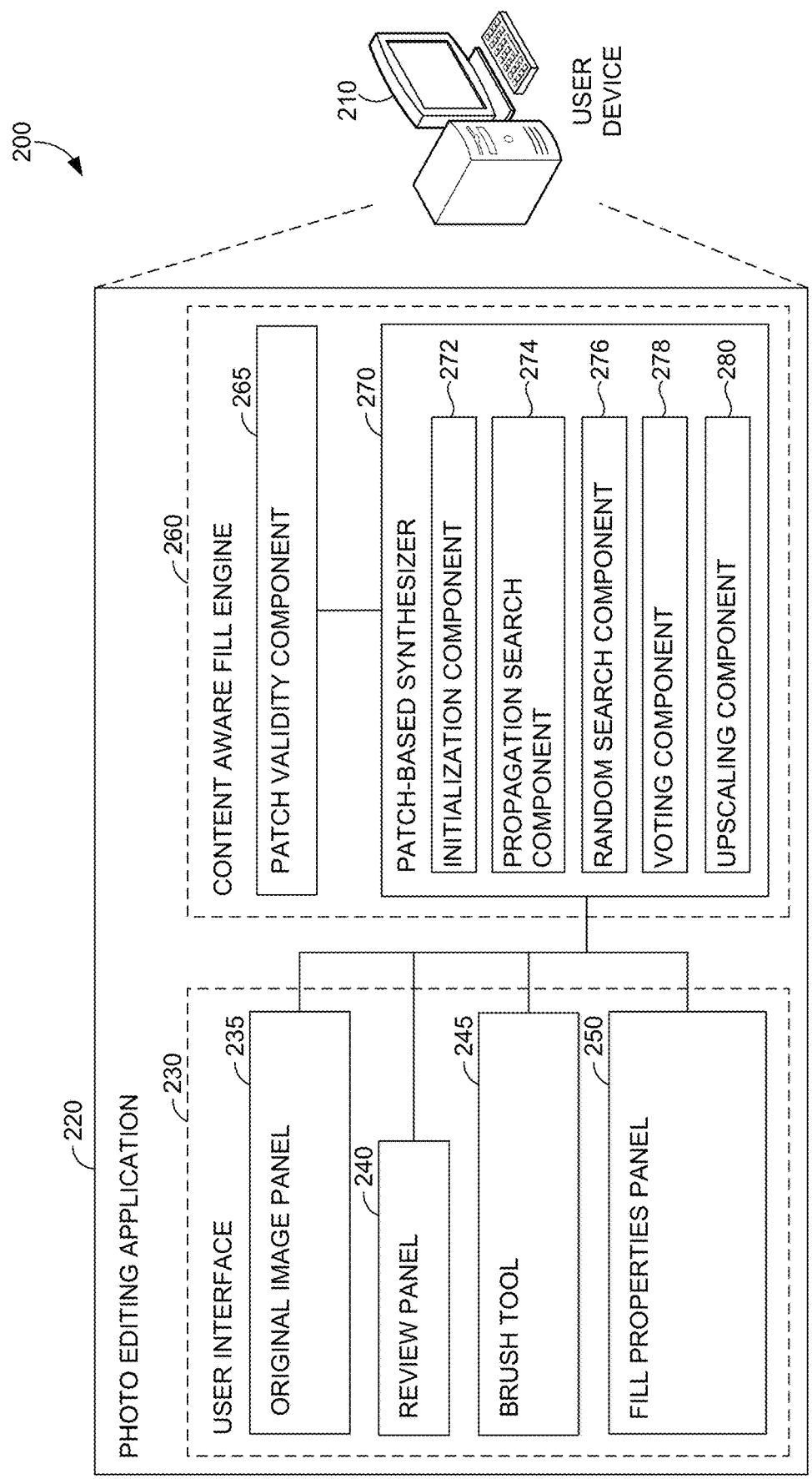
FIG. 2 is a block diagram of an exemplary computing system for automatically synthesizing a content-aware fill, in accordance with embodiments of the present invention.

Referring now to FIG. 2, a block diagram of exemplary environment 200 suitable for use in implementing embodiments of the invention is shown. Generally, environment 200 is suitable for image editing, and, among other things, facilitates automatically synthesizing a content-aware fill. Environment 200 includes user device 210 having photo editing application 220 with user interface 230 and content-aware fill engine 260. User device 210 can be any kind of computing device capable of facilitating image editing. For example, in an embodiment, user device 210 can be a computing device such as computing device 2000, as described below with reference to FIG. 20. In embodiments, user device 210 can be a personal computer (PC), a laptop computer, a workstation, a mobile computing device, a PDA, a cell phone, or the like. User interface 230 is in communication with content-aware fill engine 260. Generally, user interface 230 allows a user to customize any number of input parameters to facilitate content-aware fill engine 260 automatically synthesizing a content-aware fill.

In the embodiment illustrated by FIG. 2, user device 210 includes user interface 230 and content-aware fill engine 260. User interface 230 and/or content-aware fill engine 260 may be incorporated, or integrated, into an application or an add-on or plug-in to an application, such as photo editing application 220. Photo editing application 220 may generally be any application capable of facilitating photo or image editing. Application 220 may be a stand-alone application, a mobile application, a web application, or the like. In some implementations, the application(s) comprises a web application, which can run in a web browser, and could be hosted at least partially server-side. In addition, or instead, the application(s) can comprise a dedicated application. In some cases, the application can be integrated into the operating system (e.g., as a service). One exemplary application that may be used for photo editing is ADOBE® PHOTOSHOP®, which is a graphics editing application. Although generally discussed herein as user interface 230 and/or content-aware fill engine 260 being associated with an application, in some cases, user interface 230 and/or and content-aware fill engine 260, or some portion thereof, can be additionally or alternatively integrated into the operating system (e.g., as a service) or a server (e.g., a remote server).

Generally, user interface 230 is an interactive software interface that allows a user to customize various input parameters for an automatic synthesis of a content-aware fill. In FIG. 2, user interface 230 includes original image panel 235, results panel 240, brush tool 245 and fill properties panel 250. Generally, original image panel 235 presents an original image, and accepts a user selection of a first region of the original image to be filled and/or a user selection of a second region of the original image to be used as a sampling region. Brush tool 245 is an input tool that allows a user to interactively brush the sampling region indicated in original image panel 235 to customize the sampling region. Fill properties panel 250 presents and accepts a selection of various fill properties, such as overlay settings for the sampling region, fill settings such as similarity transform parameters for candidate patches, and output settings for the synthesized fill. Results panel 240 presents a preview of what the fill will look like prior to completion of the fill.

Figure 3:
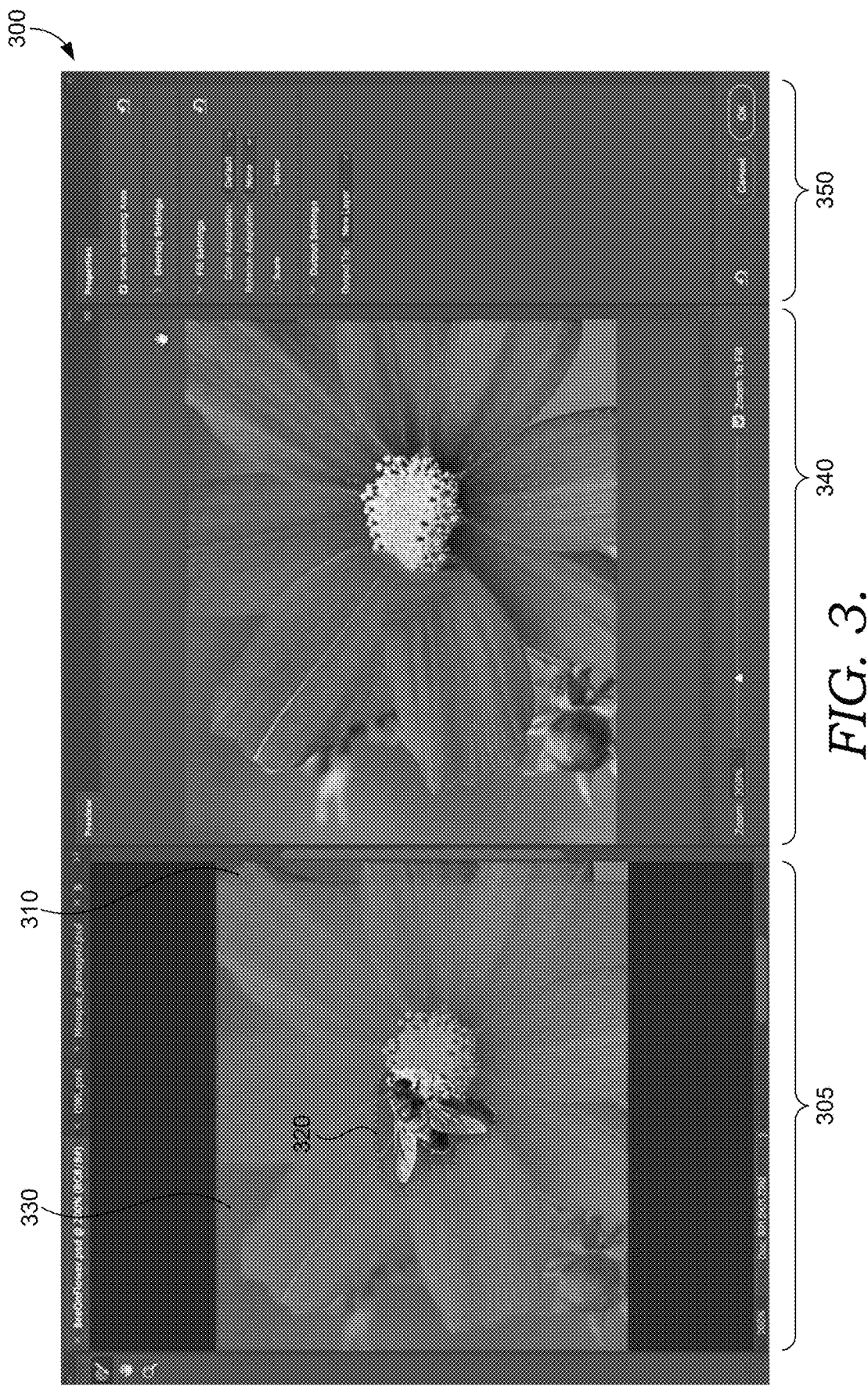
FIG. 3 illustrates an example content-aware fill workspace, in accordance with embodiments of the present invention.

Generally, user interface 230 can allow a user to specify an original image for editing. In some embodiments, user interface 230 provides an option (e.g., a menu command) to trigger a content-aware fill workspace such as content-aware fill workspace 300 depicted in FIG. 3. FIG. 3 illustrates an example layout of a user interface 230. In this embodiment, content-aware fill workspace 300 includes original image panel 305 (which can correspond to original image panel 235 of FIG. 2), results panel 340 (which can correspond to results panel 240 of FIG. 2), and fill properties panel 350 (which can correspond to fill properties panel 250 of FIG. 2).

Original image panel 305 includes original image 310 (which, in this example, is the same photograph of the flower and bee from FIG. 1). A region of the image to be filled may be user-specified, automatically generated, some combination thereof, or otherwise. For example, content-aware fill workspace 300 can provide a selection tool with which a user can specify a hole boundary such as hole boundary 320. Original image panel 305 can overlay hole boundary 320 on top of original image 310 to provide an indication of the region of original image 310 to be filled. Hole boundary 320 and/or the region within hole boundary 320 (i.e., the hole) can be stored in one or more data structures indicating the region to be filled. Additionally and/or alternatively, the boundary and/or hole can be stored in one or more data structures indicating a valid sampling region, such as a constraint mask. More specifically, the constraint mask can designate the hole as an invalid region for sampling. The sampling region from which pixels can be sampled for the content-aware fill may be user-specified, automatically generated, some combination thereof, or otherwise. The sampling region may be initialized to a default region (e.g., excluding the hole) that may be customized, for example, by a user input modifying the default region. The sampling region can be stored in one or more data structures indicating a valid sampling region, such as the constraint mask. More specifically, the constraint mask can designate the sampling region as a valid region for sampling.

In some embodiments, original image panel 305 can include an overlay to indicate the sampling region. For example, original image panel 305 includes constraint mask overlay 330. Overlay settings may be defined and/or customizable, for example, via fill properties panel 350. For example, customizable overlay settings can include a toggled display, color and/or opacity of constraint mask overlay 330. Additionally and/or alternatively, an option may be provided for constraint mask overlay 330 to depict the sampling region or to depict the excluded region of original image 310 which will not be used for sampling. In the example illustrated in FIG. 3, constraint mask overlay 330 is toggled on, transparent, red, and depicts the sampling region.

Fill properties panel 350 (which can correspond to fill properties panel 250 of FIG. 2) can present and accept a selection of various fill properties, such as overlay settings for the sampling region, fill settings such as similarity transform parameters for candidate patches, and output settings for the synthesized fill. Generally, the fill properties can be set to control the manner in which the fill is synthesized. For example, customizable fill settings can include similarity transform parameters (e.g., parameters specifying or otherwise indicating valid ranges for rotations, scaling factor, mirroring and/or translations of candidate patches), color adaption (e.g., gain and/or bias), deterministic fill synthesis, and the like. Customizable fill settings are discussed in greater detail below. Customizable output settings can include a designated output layer for the synthesized fill. For example, outputting to the current layer replaces the hole pixels in the current layer with the synthesized fill, outputting to a new layer outputs the synthesized fill to a separate layer (e.g., with transparency around it), and/or outputting to a duplicate layer copies the original image into a duplicate layer and replaces the hole pixels with the synthesized fill in the duplicate layer. Other variations for fill properties will be apparent to those of ordinary skill in the art.

Generally, content-aware fill workspace 300 can automatically pass the constraint mask and/or designated fill properties to a back end component such as content-aware fill engine 260 at any time to synthesize (or begin synthesizing) a content-aware fill using the constraint mask. For example, content-aware fill workspace 300 can automatically pass the constraint mask and/or designated fill properties to content-aware fill engine 260 upon content-aware fill workspace 300 being triggered, upon a selection of original image 310, upon a selection or modification to the hole boundary and/or the sampling region (e.g., via brush tool 245, a lasso tool, a polygonal lasso tool, an expand selection tool, a shrink selection tool, etc.), upon a selection or modification of a fill property, upon an authorization to proceed (e.g., an OK button click), and/or some other criteria. In the event a constraint mask is passed before a user selection of a hole boundary and/or sampling region, the constraint mask can be initialized to some default state (which may include, for example, an automatically detected region, a region or selection carried over from some other fill or prior iteration, a default region, etc.).

Content-aware fill workspace 300 includes results panel 340, which can include a preview of the synthesized fill prior to completion. A preview matching the final result can be generated by content-aware fill engine 260 operating on the full resolution original image 310. As described in greater detail below, content-aware fill engine 260 implements an iterative process to construct and refine a fill. Each successive iteration produces a solution with improved detail and generally consistent image structure (e.g., lines and curves in the image). A preview can be derived from this same process used to arrive at the full solution. By starting with the full resolution original image 310 (as opposed to conventional techniques which operate on a thumbnail to generate a preview) and using a fill solution after an iteration as a preview, an accurate preview can be generated matching the image structure of the end result, unlike conventional previews. Accordingly, content-aware fill engine 260 can pass the fill solution after an iteration (e.g., after each iteration) to results panel 340 for presentation to the user. In some embodiments, content-aware fill engine 260 can perform successive iterations and provide the solution to results panel 340 after each iteration. As such, results panel 340 can include a live preview with gradually updating results. These gradual updates can provide a user with quick, real-time feedback and an earlier opportunity to make any desired changes to arrive at a desired fill.

In some embodiments, content-aware fill engine 260 can provide a preview and break the process before subsequent iterations to facilitate a user input prior to completing the fill. For example, before generating a preview, content-aware fill workspace 300 can permit a user to select a desired preview resolution and/or dimension (or a default preview resolution can be utilized). Content-aware fill engine 260 can begin synthesizing a fill and break after an iteration in which the resolution of the corresponding current fill solution matches the designated preview resolution within a predetermined threshold (whether specified in pixels, as a percentage, or otherwise). In these embodiments, content-aware fill engine 260 can pass the current fill to results panel 340 for presentation as a preview. In this scenario, content-aware fill workspace 300 can prompt a user for an indication to continue processing, to change parameters and/or to zoom into or out of the preview.

A user indication to continue processing can trigger content-aware fill engine 260 to compute the remaining resolutions, up to the full-resolution result. However, a change in the hole or sampling region, or a change in similarity transform parameters for candidate patches, can render the current fill obsolete. Some existing computations can be salvaged to improve speed and avoid unnecessary recomputations. For example, if one or more masks are not impacted by a change, the masks need not be recomputed. Likewise, pyramids corresponding to the unchanged masks need not be regenerated. If the user does not change the hole, there is no need to recompute a buffer storing a distance transform from each pixel to the hole boundary. Various calculations such as these and others can be cached and reutilized to improve processing speed, as will be understood by those of ordinary skill in the art.

Another possibility at a break is a user request to zoom in or out of a preview. Since content-aware fill engine 260 already computed lower resolution solutions to arrive at the preview, those solutions can be cached, and accessed and presented in the event a user zooms out of the preview (e.g., requests a lower resolution preview). If a user zooms into the preview (e.g., requests a higher resolution preview), content-aware fill workspace 300 can pass an indication to content-aware fill engine 260 to resume the computation from the previous resolution where it was last paused, in order to produce the next preview resolution. This approach leverages prior iterations and permits content-aware fill engine 260 to quickly generate the new preview for the front end.

In some embodiments, an incorrect fill can be improved by dividing a hole into two or more sub-divisions and incrementally synthesizing a fill for each sub-division. For example, content-aware fill workspace 300 can accept an input manually identifying a first sub-division, and a fill can be generated as described above. Content-aware fill workspace 300 can accept an input (e.g., a button press) indicating the fill should be accepted, upon which content-aware fill workspace 300 can facilitate a subsequent input manually identifying a subsequent sub-division, and the process repeated. Additionally and/or alternatively to accepting inputs manually identifying sub-divisions, the sub-divisions can be automatically generated, as will be understood by those of ordinary skill in the art. In some embodiments, content-aware fill workspace 300 can accept an input indicating that the most recently generated fill should be used to generate a fill for a subsequent sub-division. In this manner, content-aware fill workspace 300 can fill a hole by incrementally generating fills for two or more sub-divisions of the hole.

The foregoing discussion utilized FIG. 3 to illustrate example content-aware fill workspace 300 with original image panel 305, results panel 340, and fill properties panel 350. In FIG. 3, original image 310 is the image of a flower with a bee collecting pollen. Results panel 340 depicts an example fill generated utilizing translations for candidate patches. As will be appreciated, the resulting fill is inaccurate. For example, the texture of the flower petals is inconsistent and blurred, and some parts of the hole were incorrectly filled with the green background. For images with non-linear features, the quality of the fill can be improved by expanding the search domain to include similarity transformations for candidate patches. For example, fill settings such as similarity transform parameters may enable rotations, scaling, and/or mirroring. The fill settings may be preset, customizable for interactive access, or otherwise.

FIGS. 4-8 illustrate some of the potential benefits resulting from interactive access to customizable fill settings and/or a customizable sampling region. As a general matter, synthesizing fills using similarity transforms for candidate patches, as opposed to simply using translations, can significantly improve fill quality. However, each image is different, so different types of transforms may be more appropriate for particular images. For example, rotations may be appropriate for curved objects or perspective images. Moreover, rotations with limited ranges may be appropriate in certain circumstances. Generally, rotation adaptation can be used to specify the degree (or range) to which patches can rotate when filling the hole as part of a patch synthesis. For example, preset fill settings may be designated (e.g., low, medium, high, full) corresponding to a range of potential rotations. Full rotations (e.g., −180° to 180°) may be appropriate for round or circular objects. Some intermediate degree of rotation may be appropriate for images with significant amounts of curvature. Some lower degree of rotation may be appropriate for images with curved lines like a bend in a road. In another example, scaling may be appropriate to improve a synthesized fill for image content with repeating patterns of different sizes, or under perspective. Mirroring (e.g., a flip such as a horizontal flip) can improve a synthesized fill for images with symmetry. Color adaptation can be used to specify gain and/or bias strength to improve a synthesized fill for images by changing brightness and/or contrast of patches used to fill the hole as part of a patch synthesis. By allowing a user to select an appropriate fill setting, a user can guide the patch synthesis to an optimal solution.

Figure 4:
FIG. 4 is an example image with an automatically synthesized content-aware fill, in accordance with embodiments of the present invention.
Figure 5:
FIG. 5 is an example image with an automatically synthesized content-aware fill, in accordance with embodiments of the present invention.

Returning to the example image of a flower with a bee collecting pollen, FIGS. 4 and 5 depict examples of automatically synthesized content-aware fills using different fill settings. Since the flower in original image 310 is generally circular, rotation adaptation can be applied to candidate patches to rotate flower petals to fill the hole. FIG. 4 illustrates an automatically synthesized content-aware fill using rotation adaptation. The resulting fill no longer includes portions of the green background, so the flower appears more natural. The result can be further improved by including mirroring. FIG. 5 illustrates an automatically synthesized content-aware fill using mirroring. In FIG. 5, the texture of the resulting fill has been improved to more closely match the texture of the remaining flower petals.

Figures 6A, 6B, 6C:
FIGS. 6A-6C are example images illustrating an automatically synthesized content-aware fill, in accordance with embodiments of the present invention.

FIGS. 6A-6C are example images illustrating an automatically synthesized content-aware fill, in accordance with embodiments of the present invention. FIG. 6A depicts a portion of an original image with woman walking into a hallway. To remove the woman from the image, the dotted region has been selected as a hole boundary, and the constraint mask overlay excludes the hole. FIG. 6A has been zoomed in, so the original image, the overlay, and the corresponding sampling region are not depicted in their entirety. FIG. 6B is an example image with an automatically synthesized content-aware fill generated with mirroring off and color adaptation on. As can be seen, the hole has been filled incorrectly (e.g., the hallway wall has been improperly extended). Since the original image includes symmetry, mirroring can be utilized to improve the fill. As such, FIG. 6C is an example image with an automatically synthesized content-aware fill generated with mirroring on and color adaptation off. As can be seen, the fill quality has been improved by using samples from a symmetric portion of the original image and by turning off gain and bias adjustments.

In addition and/or in the alternative to providing customizable similarity transform parameters, another customizable fill setting is a deterministic fill synthesis mode. Conventional patch synthesis techniques are generally multi-threaded. More specifically, a designated hole can be split it into several files for parallel processing by different threads. The timing with which the threads finalize their respective solutions can change the resulting fill solution for the designated hole. Since this timing is not known or controlled in conventional techniques, conventional patch synthesis generally is not repeatable. In a deterministic fill synthesis mode, a repeatable patch synthesis technique can be implemented, as explained in more detail below. However, since this deterministic process may increase processing time, allowing the user to control this mode permits the user perform a tradeoff between speed and repeatability.

Figure 7:
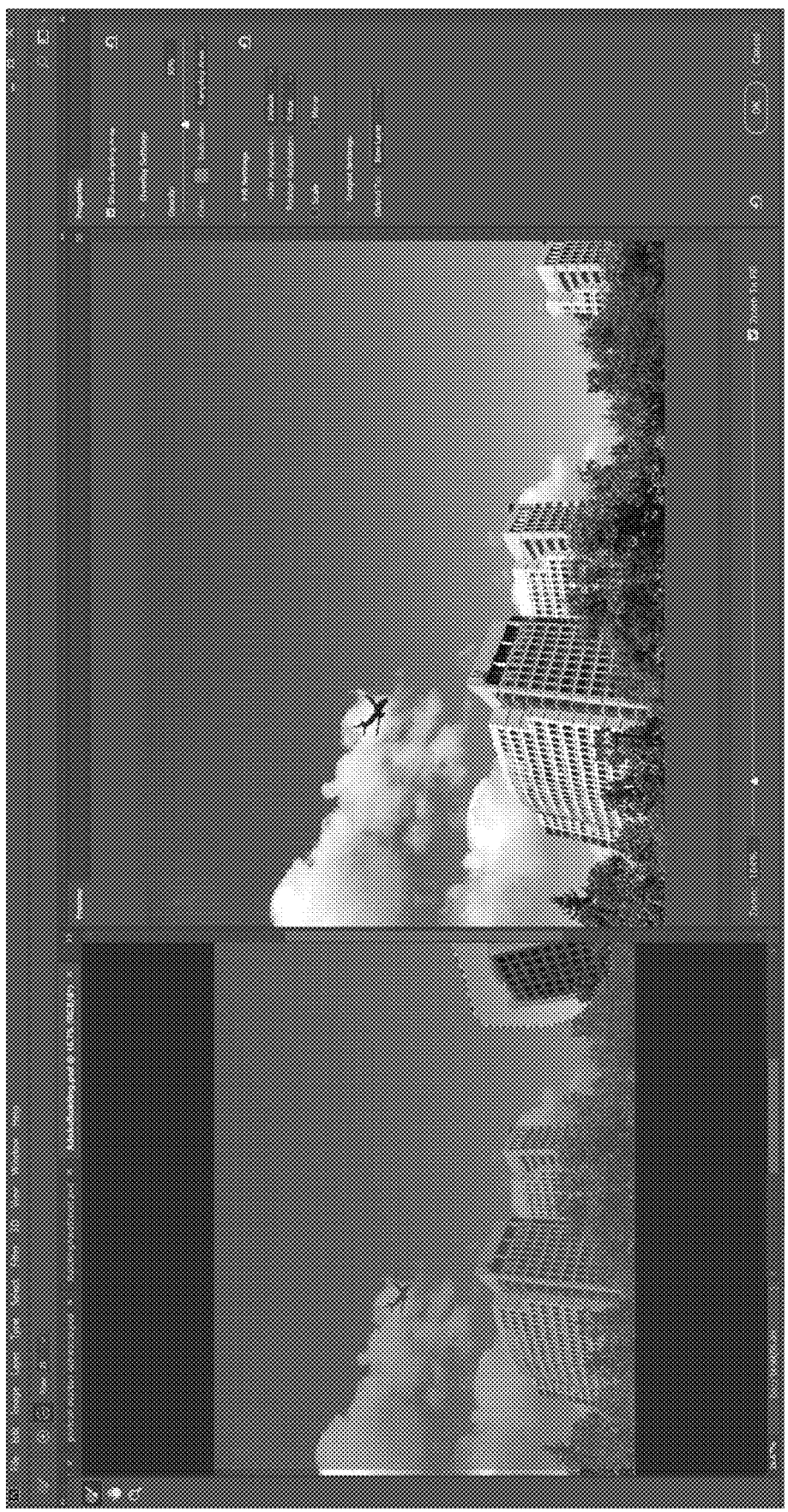
FIG. 7 illustrates an example content-aware fill workspace with an automatically synthesized content-aware fill using a default sampling region, in accordance with embodiments of the present invention.
Figure 8:
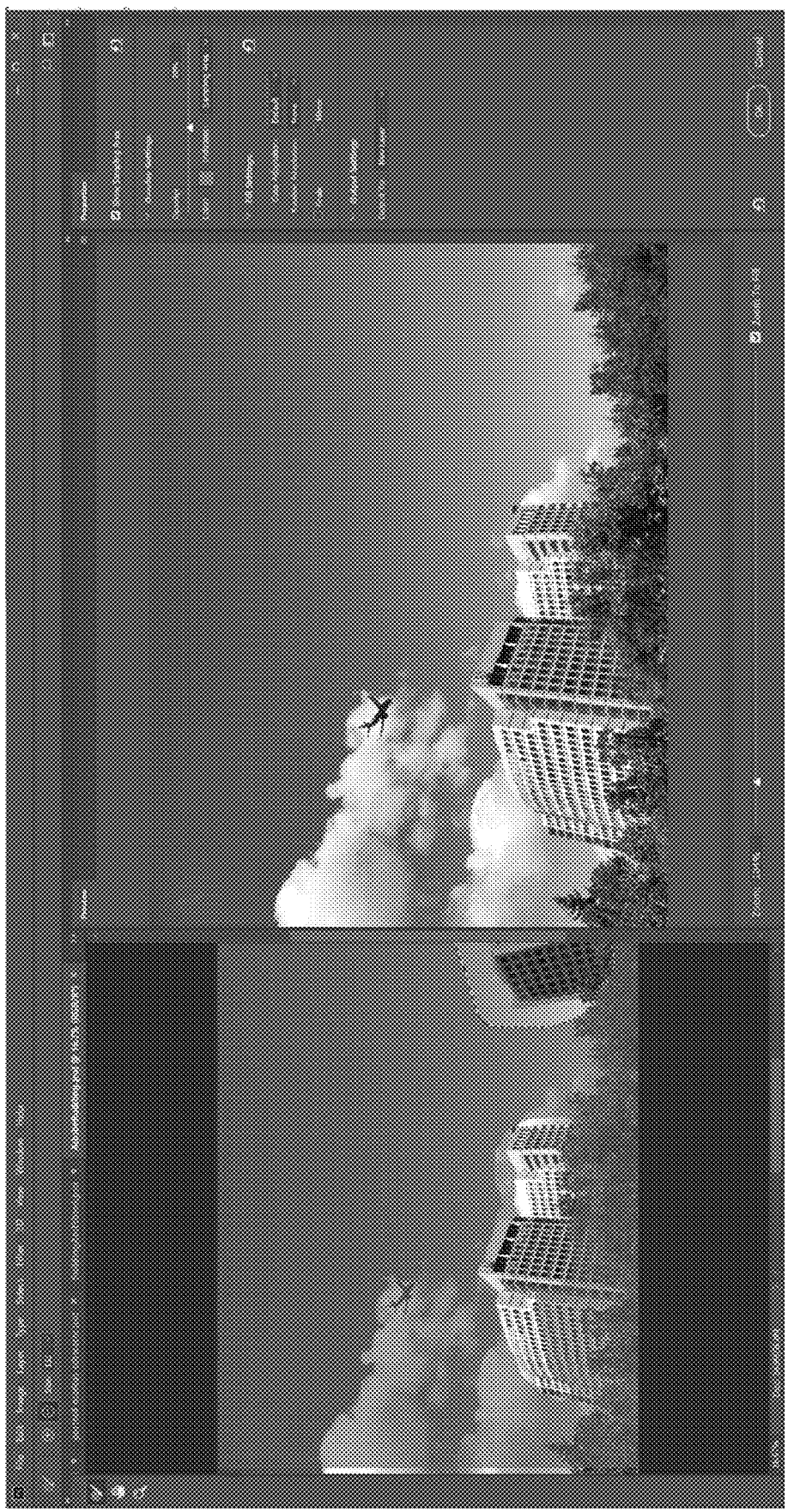
FIG. 8 illustrates an example content-aware fill workspace with an automatically synthesized content-aware fill using a customized sampling region, in accordance with embodiments of the present invention.

In addition and/or in the alternative to providing customizable fill settings, a customizable sampling region can be used to improve an automatically synthesized fill. FIGS. 7 and 8 illustrate potential benefits from utilizing a customizable sampling region. FIG. 7 illustrates an example content-aware fill workspace with an automatically synthesized content-aware fill using a default sampling region. The original image panel on the left illustrates an original image with a brown building to be removed. The dotted region around the brown building has been selected as the hole, and a default sampling region illustrated by the red overlay has been initialized, excluding the hole. In the results panel on the right, the automatically synthesized content-aware fill has incorrectly sampled from a corner of a white building in the center of the original image. In this example, instead of eliminating the brown building, the resulting fill incorrectly replaced the brown building with a portion of the white building. To adjust the resulting fill, the sampling region can be customized.

Generally, a content-aware fill workspace can facilitate a user customizing the sampling region. For example, the content-aware fill workspace may provide an input tool such as a brush tool (e.g., brush tool 245) that allows a user to interactively brush the sampling region in original image panel 235 to customize the sampling region. The brush tool can facilitate a user input adding to or subtracting from a valid sampling region, which may be stored in a constraint mask. The brush tool may be resizable to increase or decrease the brush size. Additionally and/or alternatively, the shape of the capture region of the brush tool may be customizable to any shape. As such, the brush tool can be used to add or remove from the sampling region. Additionally and/or alternatively, various other input tools can be provided to facilitate a user selection and/or modification of a hole and/or a sampling region, such as a lasso tool, a polygonal lasso tool, an expand selection tool, a shrink selection tool, and the like. In some embodiments, upon detecting completion of a user input (such as a brush stroke removing pixels from the sampling region and/or corresponding overlay), the content-aware fill workspace can automatically pass the resulting sampling region (e.g., via a constraint mask) to a back end component such as content-aware fill engine 260 to synthesize a content-aware fill using the specified constraint mask. FIG. 8 illustrates an example content-aware fill workspace with an automatically synthesized content-aware fill using a customized sampling region. As will be appreciated, sampling region and corresponding overlay have been customized with a constraint excluding the white buildings in the center of the original image. The resulting fill in the results panel on the right properly replaces the brown building with pixels from the sky and trees in the original image, instead of from the corner of the white building.

Returning now to FIG. 2, content-aware fill engine 260 includes patch validity component 265 and patch-based synthesizer 270. Patch validity component 265 and patch-based synthesizer 270 operate in communication to automatically synthesize a content-aware fill (e.g., to fill a hole indicated by a constraint mask passed from user interface 230). As explained in more detail below, patch-based synthesizer 270 may perform a patch synthesis using a randomized algorithm to generate and evaluate candidate patches and identify approximate nearest neighbor matches between image patches. This can involve an iterative process of initialization, searching, voting and upscaling for each scale of a multi-scale solution, as will be understood by those of ordinary skill in the art. Candidate patches may be generated from a source image (e.g., the sampling region designated by a constraint mask) during initialization, search, and upsampling. Generally, patch validity component 265 evaluates the validity of candidate patches by applying one or more improved patch validity tests. Advantageously, each time patch-based synthesizer 270 identifies a candidate patch, patch validity component 265 determines the validity of the patch.

Figure 9:
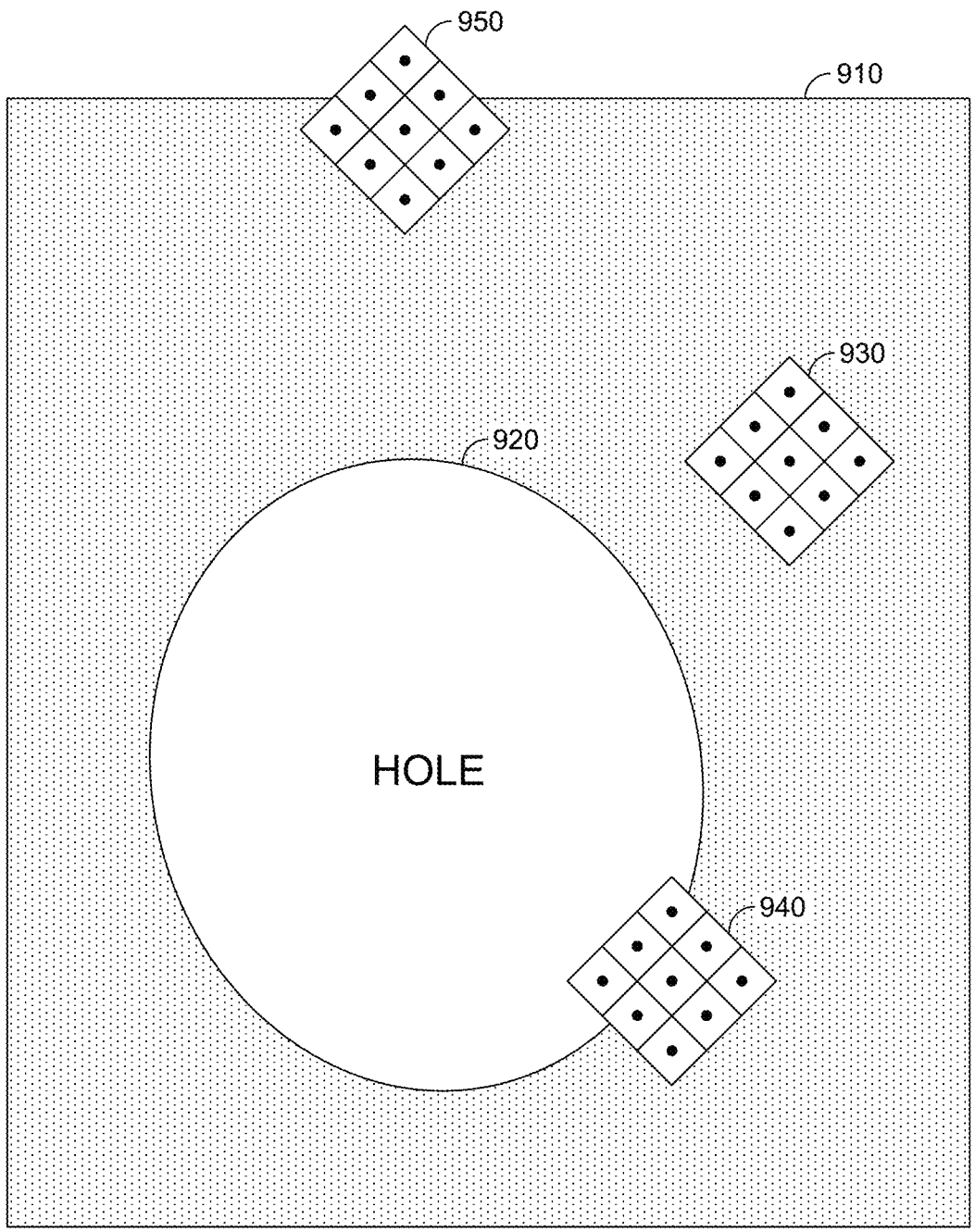
FIG. 9 illustrates examples of valid and invalid patches, in accordance with embodiments of the present invention.

Generally, the introduction of patch rotations and scaling increases the complexity of determining whether a candidate patch is a valid patch falling within the sampling region. FIG. 9 illustrates examples of valid and invalid patches. In FIG. 9, sampling region 910 excludes hole 920. To sample valid patches from sampling region 910, the patches should fall entirely within the sampling region. Patches 930, 940 and 950 are example patches illustrated with a width of three pixels each for illustration purposes. Patch 930 falls entirely within sampling region 910, so patch 930 is valid. Patch 940 includes some pixels from hole 920, so patch 940 is invalid. Patch 950 includes some pixels that fall outside of sampling region 910, so patch 950 is invalid. This latter situation might occur when the border of the sampling region coincides with the border of the original image, and applying a rotation to generate a candidate patch results in some pixels of the candidate patch falling outside of the original image. Patch validity component 265 can determine patch validity under these scenarios.

To test the validity of a similarity transformed patch with a width of k pixels, conventional techniques simply evaluate whether each pixel is within the sampling region. This essentially involves a matrix multiplication for each pixel in the patch. The complexity of this operation is $O(k^2)$. The complexity can be reduced without compromising quality by using one or more simplified tests: (1) a hole dilation test for patch validity, (2) a no dilation test for patch invalidity, and (3) a comprehensive pixel test for patch validity.

Figure 10:
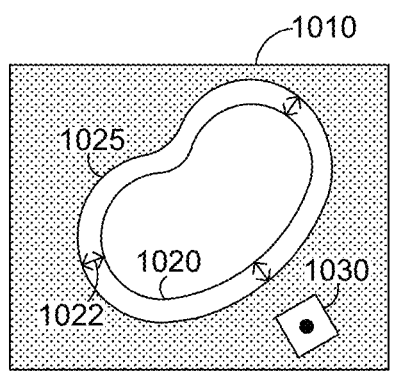
FIG. 10 illustrates a hole dilation test for patch validity, in accordance with embodiments of the present invention.

During patch synthesis iterations at finer image pyramid resolutions where speed matters the most, the center of many randomly generated candidate patches do not touch the hole. As such, a determination of patch validity in this scenario can be simplified by evaluating whether a representative pixel of a candidate patch such as the center pixel falls within a reduced sampling region with a dilated hole. The hole can be dilated by a factor that accounts for patch width, allowable transformations and/or super sampling. This test is referred to as a hole dilation test for patch validity and is illustrated by FIG. 10. In FIG. 10, hole 1020 is dilated to form dilated hole 1025. The width of dilated strip 1022 may be based on patch width, allowed patch rotations, a maximum allowed scaling factor, and/or the super sampling rate. For example, the width of dilated strip 1022 may be given by the following equation:

$$\text{Dilated strip width} = (\sqrt{2} * \text{half patch width}) * (\text{super sampling rate}) * (\text{max scaling factor}) \quad (1)$$

In this example, the $\sqrt{2}$ factor can be derived as the maximum pixel displacement from the patch center over the allowed patch rotations, as will be understood by those of ordinary skill in the art. Moreover, the half pitch width is advantageously rounded to an integer (e.g., for a patch width of 7 pixels, the half patch width can be 3 pixels). As such, in some embodiments, the dilated strip width can be varied depending on the allowed patch rotations.

Dilated hole 1025 can be used to generate reduced sampling region 1010. For example, where a constraint mask is used to encode the sampling region, the hole in the constraint mask can be dilated to generate a reduced constraint mask. The hole dilation test for patch validity can be performed by looking up whether the representative pixel in the patch (e.g., patch 1030) falls within the region designated by the reduced constraint mask (e.g., reduced sampling region 1010). A patch which passes this test is valid. Advantageously, no conclusion is drawn for patches which do not pass the test. The complexity of the hole dilation test for patch validity is $O(1)$. By implementing the hole dilation test for patch validity, the speed of patch synthesis has been observed to increase by 1.6× over matrix multiplication with $O(k^2)$.

Figure 11:
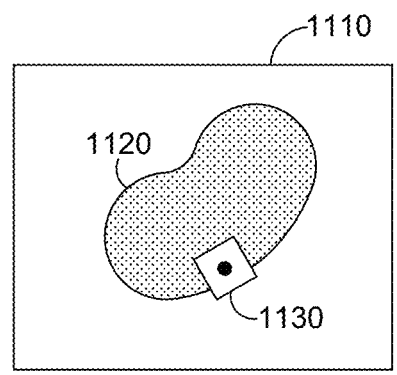
FIG. 11 illustrates a no-dilation test for patch invalidity, in accordance with embodiments of the present invention.

During patch synthesis iterations at courser image pyramid resolutions, the center of many randomly generated candidate patches (e.g., NNF field initialization, search, and upsampling) touches the hole. As such, a determination of patch invalidity in this scenario can be simplified by evaluating whether a representative pixel of a candidate patch such as the center pixel falls within the hole. This is referred to as a no-dilation test for patch invalidity and is illustrated by FIG. 11. In FIG. 11, a determination of whether patch 1130 falls within hole 1120 can be performed by looking up whether a representative pixel such as the center pixel falls within the hole. The test can be performed in the inverse by determining whether the representative pixel falls outside of sampling region 1110. A patch which satisfies this criteria is invalid. Advantageously, no conclusion is drawn for patches which do not satisfy this criteria. The complexity of the no-dilation test for patch invalidity is $O(1)$. By implementing the no-dilation test for patch invalidity, the speed of patch synthesis has been observed to increase by 1.15× over matrix multiplication with $O(k^2)$.

Figure 12:
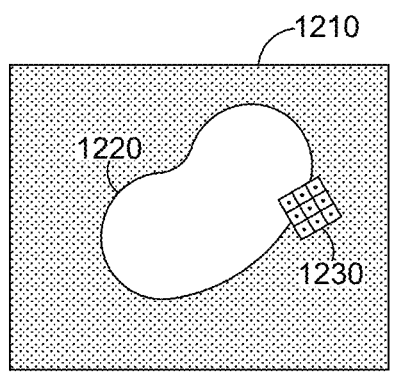
FIG. 12 illustrates a comprehensive pixel test for patch validity, in accordance with embodiments of the present invention.

Applying the hole dilation test for patch validity and the no-dilation test for patch invalidity will not conclusively determine patch validity for candidate patches whose center pixel falls within the dilated strip. As such, a determination of patch validity can be performed in some instances by looking up whether each pixel in a candidate patch falls within the sampling region (e.g., designated by the constraint mask). This is referred to as comprehensive pixel test for patch validity and is illustrated by FIG. 12. In FIG. 12, each pixel of patch 1230 is tested to determine whether it falls within sampling region 1210 and is thus outside of hole 1220. Due to the relatively larger computational demands of this comprehensive pixel test, advantageously only those patches whose validity cannot be determined using either of the hole dilation test for patch validity or the no-dilation test for patch invalidity are tested with the comprehensive pixel test. A patch that passes the comprehensive pixel test is valid, while a patch that fails the comprehensive pixel test is invalid. It is possible to maximize speed and facilitate more efficient hardware usage by calculating the pixel coordinates for each pixel in a given patch row with one fused multiple-add (FMA) vector instruction, as will be understood by those of ordinary skill in the art. By processing each patch row pixel coordinates calculation as a vector, the complexity of the comprehensive pixel test for patch validity is improved to $O(k)$, as opposed to matrix multiplication with $O(k^2)$.

In some embodiments, one or more of the patch validity tests can be enhanced by using a fringe test for range invalidity. Sometimes a candidate patch can be generated with one or more pixels with invalid coordinates (e.g., falling outside of an image or other initialized data structure), for example, due to the introduction of patch rotations. However, when accessing a data structure (e.g., to lookup whether a particular pixel falls within the constraint mask), the access must be valid and within the allocated block of memory for that structure. Conventionally, four conditional range tests can be performed to determine whether each pixel to be tested has a valid range (e.g., one test for each of four image boundaries). Instead of the four conditional range tests, the fringe test for range invalidity can be performed to simplify range testing.

Figure 13:
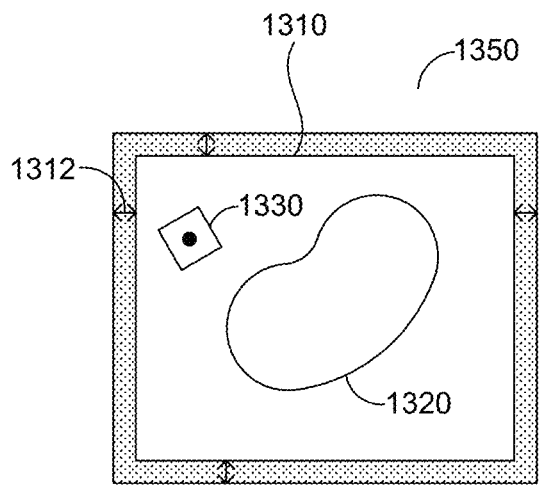
FIG. 13 illustrates a fringe test for range invalidity, in accordance with embodiments of the present invention.

Generally, a fringe test for range invalidity can be performed by adding a fringe around the boundary of a valid region (e.g., the image) to indicate an invalid range. As such, range invalidity for a particular pixel to be tested can be determined by looking up whether the pixel falls within the fringe. FIG. 13 illustrates a fringe test for range invalidity. In FIG. 13, fringe 1350 is added around image boundary 1310. Width 1312 of fringe 1350 may be based on patch width, allowed patch rotations, a maximum allowed scaling factor, and/or the super sampling rate. For example, the width of fringe 1350 may be given by equation (1) above.

The fringe test for range invalidity can be performed by looking up whether a pixel (e.g., from patch 1330) falls within the fringe (e.g., fringe 1350). In some embodiments, the fringe can be added as an invalid region to a mask such as the constraint mask. If a pixel falls within the fringe, it has an invalid range, and its patch is invalid. The complexity of the fringe test for range invalidity is O(1), reducing the O(4) complexity of the four conventional conditional range tests by a factor of four for each application of the fringe test (e.g., each lookup).

The fringe test for range invalidity can be incorporated into one or more (e.g., all) of the patch validity tests. For example, in FIG. 13, assuming a pixel of patch 1330 is to be tested to look up whether it falls within a reduced sampling region (e.g., during a hole dilation test for patch validity), within hole 1320 (e.g., during a no dilation test for patch invalidity) and/or within a valid sampling region (e.g., during comprehensive pixel test for patch validity), the fringe test for range invalidity can be applied to determine whether the pixel under test has a valid range before performing each lookup. Since the hole dilation and no dilation tests comprise one lookup each, and the comprehensive pixel test comprises $k^2$ lookups, utilizing the fringe test can reduce the complexity of range testing by a factor of four for each of the hole dilation and no-dilation tests, and by a factor of $4k^2$ for the comprehensive pixel test.

Generally, one or more of the improved patch validity tests can be incorporated into an interactive system for automatically synthesizing a content-aware fill. For example, in the embodiment illustrated in FIG. 2, patch validity component 265 can evaluate the validity of candidate patches for patch-based synthesizer 270 by applying one or more improved patch validity tests. Use of the improved validity tests described herein has been observed to increase the speed of patch synthesis by almost 1.75× over matrix multiplication techniques with $O(k^2)$. For 90% of the candidate patches tested, the improved patch validity tests described herein determined patch validity using a single lookup with O(1).

In the example implementation depicted in FIG. 2, patch-based synthesizer 270 performs a patch synthesis using a randomized algorithm to generate and evaluate candidate patches and identify approximate nearest neighbor matches between image patches. To construct a given a target image (e.g., a hole) using image patches transformed from a source image, a data structure called a nearest neighbor field (NNF) can be used to manage mappings between patches in the source and target images. The NNF includes a transform for each pixel in the target image. As described herein, these transforms may include similarity transforms. For a given pixel, the transform in the NNF for that pixel identifies a corresponding source patch which can be tested for similarity to a target patch associated with the pixel. The goal of patch-based synthesizer 270 is to identify a source patch (e.g., from a valid sampling region) that best matches each target patch (i.e., the nearest neighbor). The NNF field can be updated during various stages of the synthesis process to keep track of the nearest neighbor source patch for each target patch.

Patch-based synthesizer 270 can involve an iterative process of initialization, searching, voting and upscaling for each scale of a multi-scale solution, as will be understood by those of ordinary skill in the art. As such, in the embodiment illustrated by FIG. 2, patch-based synthesizer 270 includes corresponding initialization component 272, propagation search component 274, random search component 276, voting component 278 and upscaling component 280.

Figure 14:
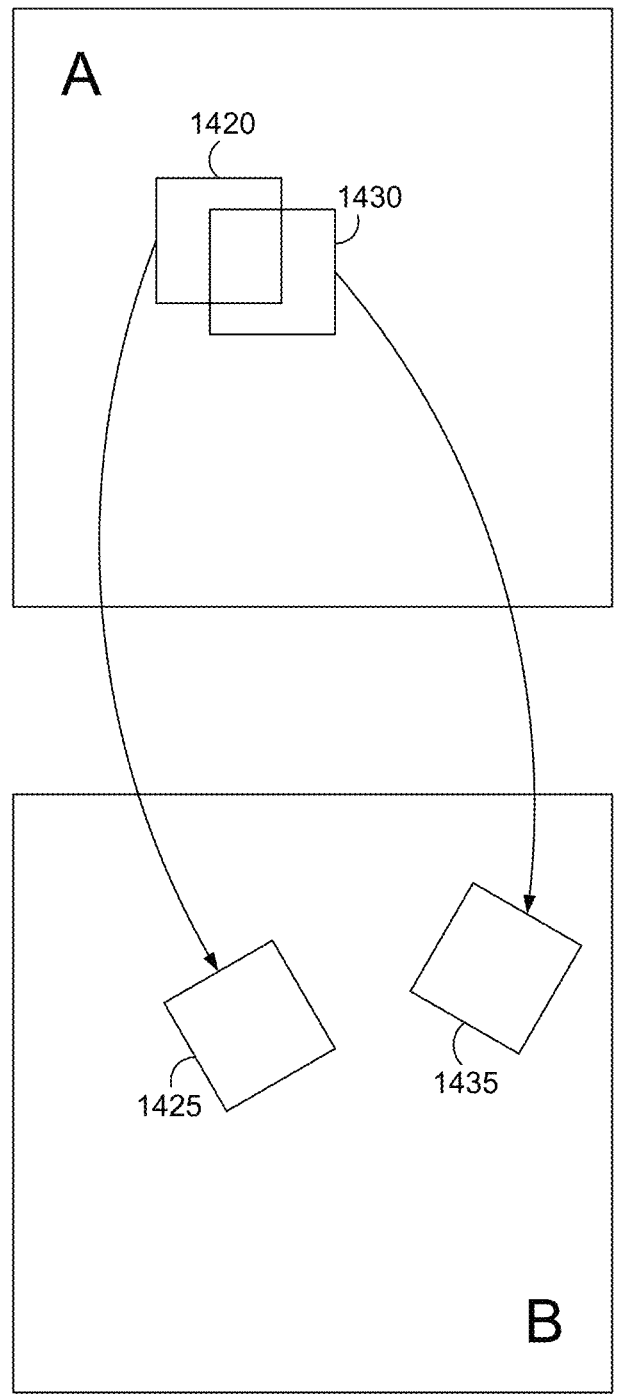
FIG. 14 illustrates examples of randomly generated transforms, in accordance with embodiments of the present invention.

For each target pixel from a target image (e.g., a hole), initialization component 272 assigns a randomly generated transform as an initialization. FIG. 14 illustrates examples of randomly generated transforms that identify candidate patches from source image B (e.g., patches 1425, 1435) which can be used as corresponding target patches for target image A (e.g., patches 1420, 1430). As described herein, these transforms may include similarity transforms. Similarity transform parameters may be user-selected, pre-determined, some combination thereof, or otherwise. Generally, the randomly generated transforms are bounded over the applicable similarity transform parameters (e.g., translation, scale, rotation and/or mirror search domains). Advantageously, patch validity component 265 determines the validity of each candidate patch. For candidate source patches that fail the patch validity test, initialization component 272 assigns a new randomly generated transform to replace the failed candidate patch, and the patch validity test is repeated. If a patch validity test fails some predetermined amount of times (e.g., 256), a candidate patch may be generated by reducing the valid sampling region (e.g., dilating the hole), bounding the corresponding search domain and/or by using a randomly generated simple translation, rather than a full similarity transform. As such, this alternative technique can be utilized to generate a valid candidate patch.

Generally, patch-based synthesizer 270 performs searching (e.g., via propagation search component 274 and random search component 276) to identify candidate patches that improve the NNF, as will be understood by those of ordinary skill in the art. Advantageously, patch validity component 265 determines the validity of each candidate patch. If a candidate source patch fails a patch validity test, the candidate patch is not utilized to improve the NNF. Candidate patches that pass patch validity are evaluated to determine whether a given candidate patch is a closer match for a particular target patch than an existing nearest neighbor in the NNF (e.g., whether a candidate patch reduces patch distance). In other words, NNF=Min(NNF, Previous NNF).

In some embodiments, propagation search component 274 and random search component 276 can identify candidate patches in a manner that facilitates a deterministic fill synthesis. In conventional techniques, a designated hole can be split up into several sub-divisions for parallel processing by different threads. In one example, a hole might be split up into three sub-divisions, and each of three threads processes a corresponding sub-division in parallel. In conventional techniques, a particular thread processes each pixel in an allocated sub-division in scanline order. For example, for a given pixel, propagation search component 274 propagates solutions for neighboring pixels and selects the best solution, random search component 276 identifies solutions for randomly identified pixels and selects the best solution, and the assigned thread moves onto the next pixel in scanline order. However, because some threads may finish generating a fill for an assigned sub-division faster than other threads, often times fills are generated for a sub-division using patches sampled from an incomplete fill for a neighboring sub-division. As a result, conventional patch synthesis generally is not repeatable.

As such, in some embodiments, a designated hole can be split up into more sub-divisions than threads, and multiple threads can be allocated to only process non-bordering sub-divisions in parallel. In a simple example, assume a hole is split into six blocks, 0-5. For even iterations of patch-based synthesizer 270, three threads can process alternating blocks (e.g., 0, 2, 4) in scanline order. During odd iterations, the threads can process alternating blocks in reverse scanline order (e.g., 1, 3, 5). Because neighboring sub-divisions have completed fills by the time any thread finishes processing a particular sub-division, the timing by which each thread finishes processing its allocated sub-division does not matter. As such, allocating multiple threads to process non-bordering sub-divisions in parallel can produce deterministic results.

In some embodiments, a wavefront technique can be applied to identify candidate patches to facilitate a deterministic fill synthesis. Generally, wavefront processing is a technique for processing a multidimensional grid for which a particular unit in the grid depends upon other units in the grid. By starting in a corner, processing proceeds in a diagonal sweep across the grid which resembles a wavefront. In the context of a patch-based synthesis, searching can be implemented utilizing a wavefront instead of in scanline order (e.g., propagation search component 274 can propagate solutions for a neighboring pixel above and for a neighboring pixel to the left). Further, a random number generator utilized by random search component 276 to randomly identified pixels can be modified. Random number generators are usually designed to generate a known sequence of uniform numbers when given a seed. For wavefront processing to produce a deterministic patch synthesis, the random number generator can be modified to accept <x, y, patch-based synthesizer iteration, random search iteration> as its input to generate a uniform number. In this manner, for a given <x,y> pixel value, a given sequence of calls to the random number generator will produce the same results. In this manner, a deterministic set of candidate patches can be identified, facilitating a deterministic fill synthesis. Other variations will be understood by those of ordinary skill in the art.

Generally, patch-based synthesizer 270 performs voting (e.g., via voting component 278) to generate a proposed target image. Generally, patch-voting is performed to accumulate the pixel colors of each overlapping neighbor patch, and the color votes are weighted averaged. The proposed target image can be passed to the front end (e.g., results panel 240) for presentation as a preview. As described above, during each subsequent iteration, the proposed target image is updated, and the updated target image can be passed to the front end for each iteration. The result is a gradually updating, live preview. These gradual updates can provide a user with quick, real-time feedback and an earlier opportunity to make any desired changes to arrive at a desired fill.

Patch-based synthesizer 270 performs upscaling (e.g., via upscaling component 280) to upscale the current NNF for use as a baseline during a subsequent iteration at the next scale. As this upscaling can produce invalid patches, patch validity component 265 advantageously determines the validity of candidate patches corresponding to the upscaled NNF. Candidate patches that pass patch validity are evaluated during a subsequent patch-based synthesizer 270 iteration to determine whether a given candidate patch is a closer match for a particular target patch than a corresponding candidate patch generated from a randomly initialized NNF.

Generally, the flow through patch-based synthesizer 270 is repeated for subsequent pyramid scales until a full resolution solution is generated and passed to the front end for presentation to a user. In some embodiments, patch-based synthesizer 270 can break upon some component detecting an updated (e.g. by the user) sampling region and/or an applicable translation, scale, rotation and/or mirror search domain. In this scenario, patch-based synthesizer 270 can salvage existing computations to improve speed and avoid unnecessary recomputations, as described in more detail above, and may automatically begin processing the updated sampling region and/or search domain. Additionally and/or alternatively, patch-based synthesizer 270 can pass a proposed target image for presentation as a preview and break its process to facilitate a user input prior to completing the fill, as described in more detail above. A user indication to continue processing can trigger patch-based synthesizer 270 to compute the remaining resolutions, as described in more detail above.

As such, using implementations described herein, a user can efficiently and effectively synthesize content-aware fills. Among the improvements over conventional techniques, the front end user interface allows a user to customize a sampling region and fill properties to optimize a content-aware fill based on image content. A live preview provides gradually updating results, providing a user with quick, real-time feedback and an earlier opportunity to make changes and arrive at a desired fill. The back end content-aware fill engine provides expanded support for similarity transforms, thereby improving fill quality. Improved patch validity tests significantly reduce the computational complexity required to support this expanded functionality. These techniques can be used to synthesize better, faster fills.

Although techniques are described herein with respect to image completion in the context of photo editing, the present techniques may be applied to any hole-filling algorithm based on hole-filling application based on example-based optimization. Moreover, although improved patch validity tests are described herein with reference to a hole-fitting application, in some embodiments, one or more improved patch validity tests may be applied in various other implementations, including imagery targeting, brushables, image reshuffling, content removal, dense correspondence algorithms (NRDC), image morphing, supersolution, denoising, deblurring, and the like. These implementations are merely exemplary, and other implementations will be understood by those of ordinary skill in the art.

Exemplary Flow Diagrams

With reference now to FIGS. 15-18, flow diagrams are provided illustrating methods for various techniques described herein. Each block of the methods 1500, 1600, 1700 and 1800 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Figure 15:
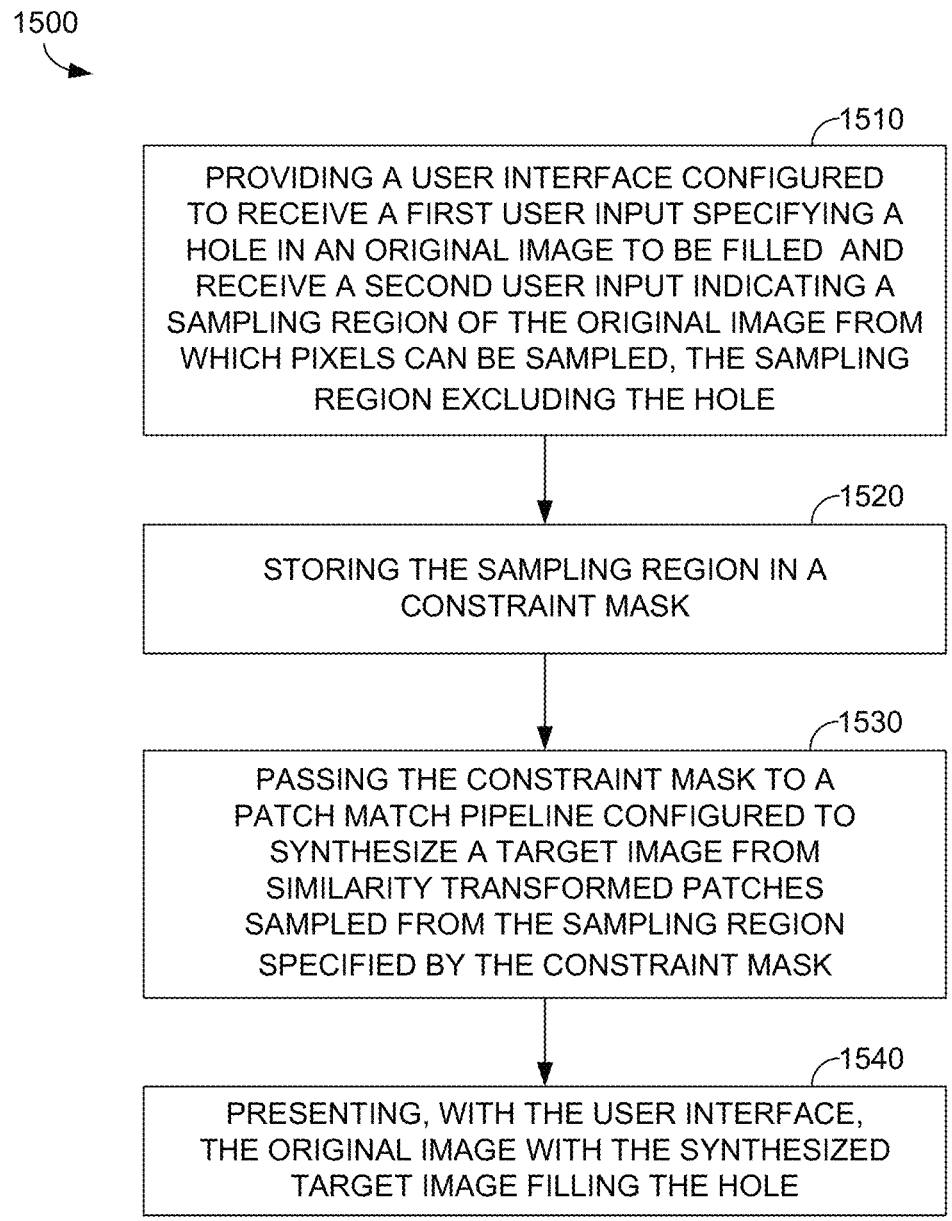
FIG. 15 is a flow diagram showing a method for automatically synthesizing a target image to fill a hole in an original image, according to various embodiments of the present invention.

Turning initially to FIG. 15, FIG. 15 illustrates a method 1500 for automatically synthesizing a target image to fill a hole in an original image, according to various embodiments described herein. Initially at block 1510, a user interface is provided. The user interface is configured to receive a first user input specifying a hole in an original image to be filled. The user interface is also configured to receive a second user input indicating a sampling region of the original image from which pixels can be sampled, the sampling region excluding the hole. At block 1520, the sampling region is stored in a constraint mask. At block 1530, the constraint mask is passed to a patch-based synthesizer configured to synthesize a target image from similarity transformed patches sampled from the sampling region specified by the constraint mask. At block 1540, the user interface presents the original image with the synthesized target image filling the hole.

Figure 16:
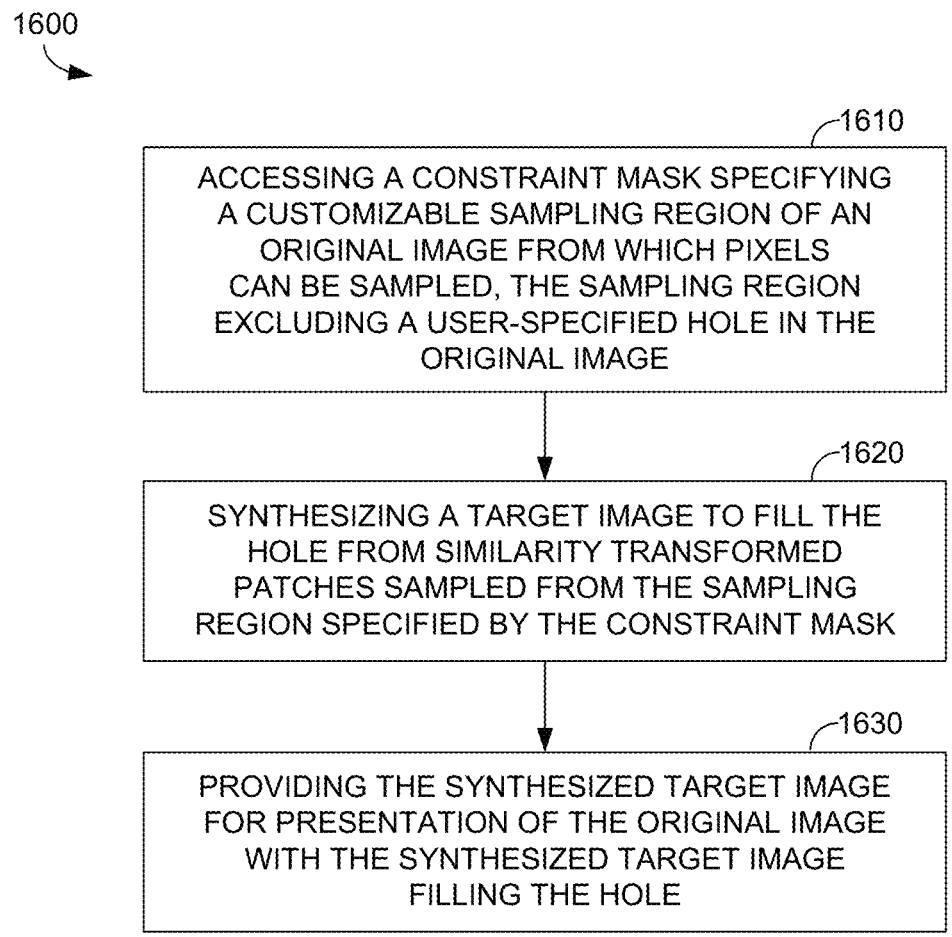
FIG. 16 is a flow diagram showing a method for automatically synthesizing a target image to fill a hole in an original image, according to various embodiments of the present invention.

Turning now to FIG. 16, FIG. 16 illustrates a method 1600 for automatically synthesizing a target image to fill a hole in an original image, according to various embodiments described herein. Initially at block 1610, a constraint mask is accessed. The constraint mask specifies a customizable sampling region of an original image from which pixels can be sampled. The sampling region excludes a user-specified hole in the original image. At block 1620, a target image is synthesized to fill the hole from similarity transformed patches sampled from the sampling region specified by the constraint mask. At block 1630, the synthesized target image is provided for presentation of the original image with the synthesized target image filling the hole.

Figure 17:
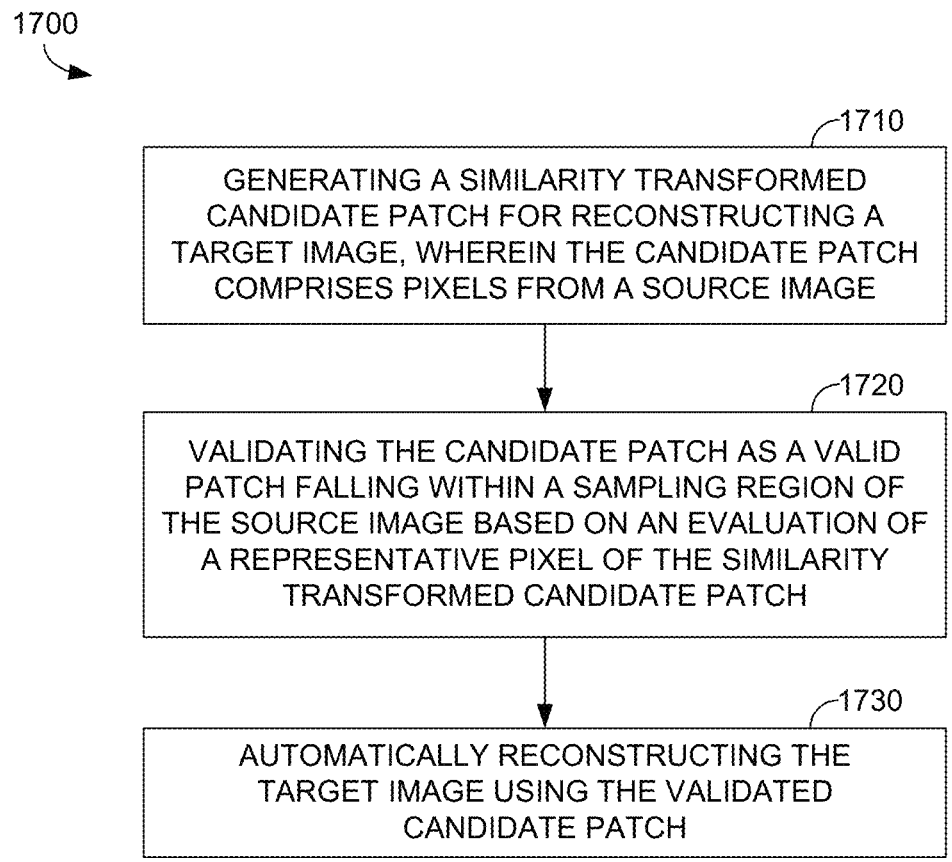
FIG. 17 is a flow diagram showing a method for patch validity testing, according to various embodiments of the present invention.

Turning now to FIG. 17, FIG. 17 illustrates a method 1700 for patch validity testing, according to various embodiments described herein. Initially at block 1710, a similarity transformed candidate patch is generated for reconstructing a target image. The candidate patch comprises pixels from a source image. At block 1720, the candidate patch is validated as a valid patch falling within a sampling region of the source image based on an evaluation of a representative pixel of the similarity transformed candidate patch. At block 1730, the target image is automatically reconstructed using the validated candidate patch.

Figure 18:
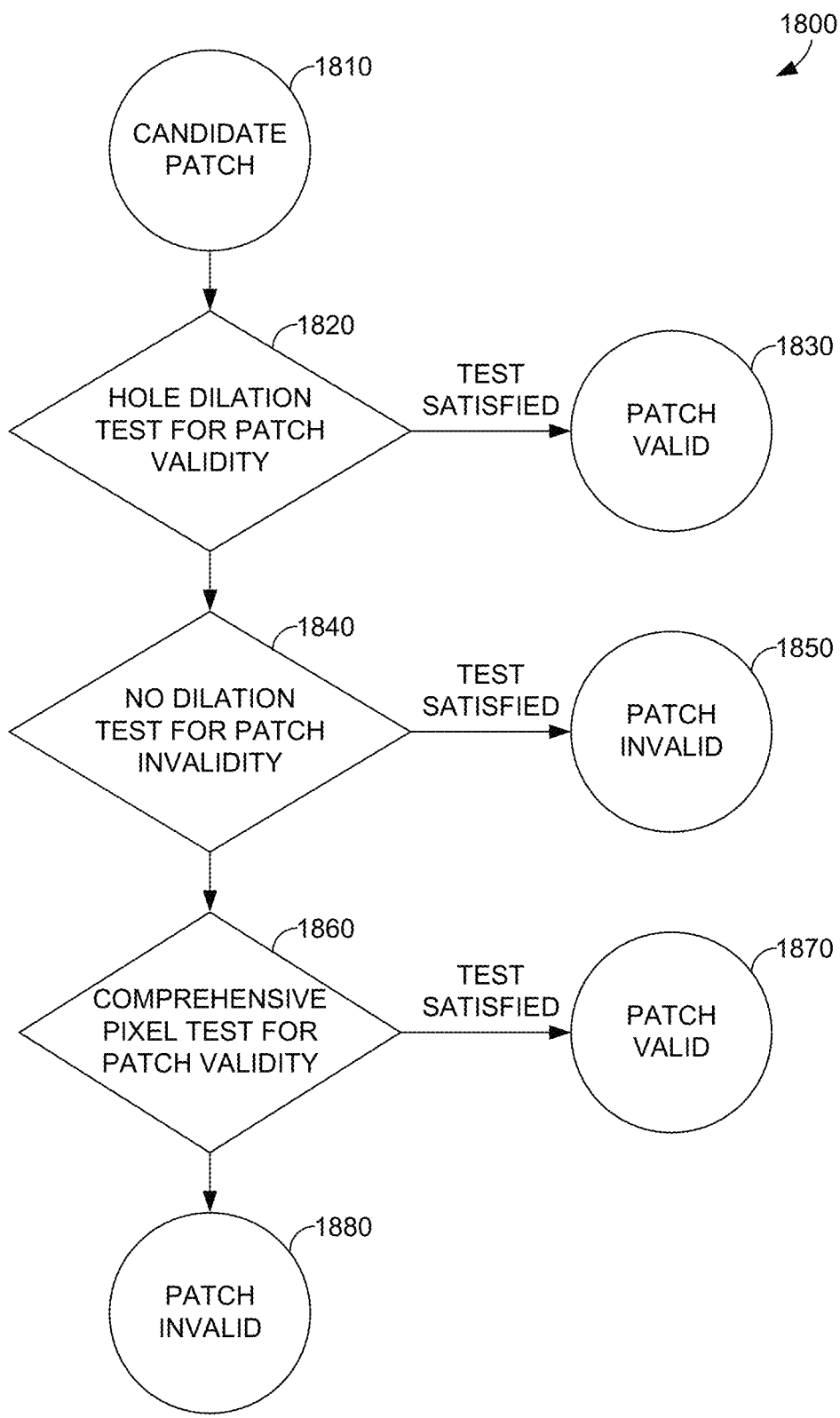
FIG. 18 is a flow diagram showing a method for patch validity testing, according to various embodiments of the present invention.

Turning now to FIG. 18, FIG. 18 illustrates a method 1800 for patch validity testing, according to various embodiments described herein. Initially at block 1820, candidate patch 1810 is tested using a hole dilation test for patch validity. If test 1820 is satisfied, conclusion 1830 is drawn that candidate patch 1810 is a valid patch. If test 1820 is not satisfied, candidate patch 1810 is tested at block 1840 using a no dilation test for patch invalidity. If test 1840 is satisfied, conclusion 1850 is drawn that candidate patch 1810 is an invalid patch. If test 1840 is not satisfied, candidate patch 1810 is tested at block 1860 using a comprehensive pixel test for patch validity. If test 1860 is satisfied, conclusion 1870 is drawn that candidate patch 1810 is a valid patch. If test 1860 is not satisfied, conclusion 1880 is drawn that candidate patch 1810 is an invalid patch.

Exemplary Computing Environment

Figure 19:
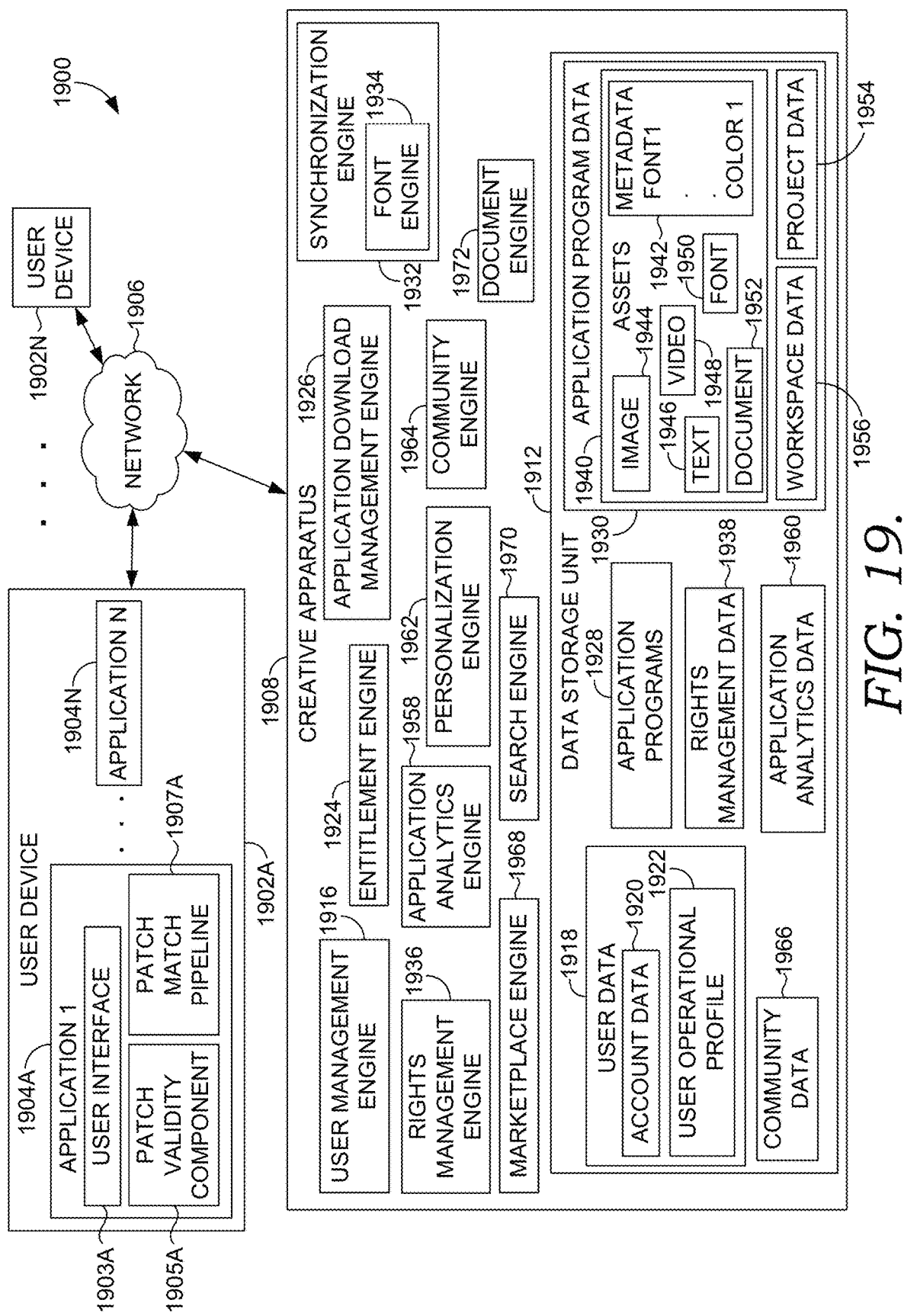
FIG. 19 is a block diagram of an exemplary computing environment in which embodiments of the invention may be employed.

FIG. 19 is a diagram of environment 1900 in which one or more embodiments of the present disclosure can be practiced. Environment 1900 includes one or more user devices, such as user devices 1902A-1902N. Examples of user devices include, but are not limited to, a personal computer (PC), tablet computer, a desktop computer, cellular telephone, a processing unit, any combination of these devices, or any other suitable device having one or more processors. Each user device includes at least one application supported by creative apparatus 1908. It is to be appreciated that following description may generally refer to user device 1902A as an example and any other user device can be used.

A user of the user device can utilize various products, applications, or services supported by creative apparatus 1908 via network 1906. User devices 1902A-1902N can be operated by various users. Examples of the users include, but are not limited to, creative professionals or hobbyists who use creative tools to generate, edit, track, or manage creative content, advertisers, publishers, developers, content owners, content managers, content creators, content viewers, content consumers, designers, editors, any combination of these users, or any other user who uses digital tools to create, edit, track, or manage digital experiences.

A digital tool, as described herein, includes a tool that is used for performing a function or a workflow electronically. Examples of a digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. A digital tool includes creative apparatus 1908.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

User devices 1902A-1902N can be connected to creative apparatus 1908 via network 1906. Examples of network 1906 include, but are not limited to, internet, local area network (LAN), wireless area network, wired area network, wide area network, and the like.

Creative apparatus 1908 includes one or more engines for providing one or more digital experiences to the user. Creative apparatus 1908 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. Creative apparatus 1908 also includes data storage unit 1912. Data storage unit 1912 can be implemented as one or more databases or one or more data servers. Data storage unit 1912 includes data that is used by the engines of creative apparatus 1908.

A user of user device 1902A visits a webpage or an application store to explore applications supported by creative apparatus 1908. Creative apparatus 1908 provides the applications as a software as a service (SaaS), or as a standalone application that can be installed on user device 1902A, or as a combination. The user can create an account with creative apparatus 1908 by providing user details and also by creating login details. Alternatively, creative apparatus 1908 can automatically create login details for the user in response to receipt of the user details. In some embodiments, the user is also prompted to install an application manager. The application manager enables the user to manage installation of various applications supported by creative apparatus 1908 and also to manage other functionalities, such as updates, subscription account and the like, associated with the applications. User details are received by user management engine 1916 and stored as user data 1918 in data storage unit 1912. In some embodiments, user data 1918 further includes account data 1920 under which the user details are stored.

The user can either opt for a trial account or can make payment based on type of account or subscription chosen by the user. Alternatively, the payment can be based on product or number of products chosen by the user. Based on payment details of the user, user operational profile 1922 is generated by entitlement engine 1924. User operational profile 1922 is stored in data storage unit 1912 and indicates entitlement of the user to various products or services. User operational profile 1922 also indicates type of user, i.e. free, trial, student, discounted, or paid.

In some embodiment, user management engine 1916 and entitlement engine 1924 can be one single engine performing the functionalities of both the engines.

The user can then install various applications supported by creative apparatus 1908 via an application download management engine 1926. Application installers or application programs 1928 present in data storage unit 1912 are fetched by application download management engine 1926 and made available to the user directly or via the application manager. In one embodiment, an indication of all application programs 1928 are fetched and provided to the user via an interface of the application manager. In another embodiment, an indication of application programs 1928 for which the user is eligible based on user's operational profile are displayed to the user. The user then selects application programs 1928 or the applications that the user wants to download. Application programs 1928 are then downloaded on user device 1902A by the application manager via the application download management engine 1926. Corresponding data regarding the download is also updated in user operational profile 1922. Application program 1928 is an example of the digital tool. Application download management engine 1926 also manages the process of providing updates to user device 1902A.

Upon download, installation and launching of an application program, in one embodiment, the user is asked to provide the login details. A check is again made by user management engine 1916 and entitlement engine 1924 to ensure that the user is entitled to use the application program. In another embodiment, direct access is provided to the application program as the user is already logged into the application manager.

The user uses one or more application programs 1904A-1904N installed on the user device to create one or more projects or assets. In addition, the user also has a workspace within each application program. The workspace, as described herein, includes setting of the application program, setting of tools or setting of user interface provided by the application program, and any other setting or properties specific to the application program. Each user can have a workspace. The workspace, the projects, and/or the assets can be stored as application program data 1930 in data storage unit 1912 by synchronization engine 1932. Alternatively or additionally, such data can be stored at the user device, such as user device 1902A.

Application program data 1930 includes one or more assets 1940. Assets 1940 can be a shared asset which the user wants to share with other users or which the user wants to offer on a marketplace. Assets 1940 can also be shared across multiple application programs 1928. Each asset includes metadata 1942. Examples of metadata 1942 include, but are not limited to, font, color, size, shape, coordinate, a combination of any of these, and the like. In addition, in one embodiment, each asset also includes a file. Examples of the file include, but are not limited to, image 1944, text 1946, video 1948, font 1950, document 1952, a combination of any of these, and the like. In another embodiment, an asset only includes metadata 1942.

Application program data 1930 also include project data 1954 and workspace data 1956. In one embodiment, project data 1954 includes assets 1940. In another embodiment, assets 1940 are standalone assets. Similarly, workspace data 1956 can be part of project data 1954 in one embodiment while it may be standalone data in other embodiment.

A user can operate one or more user device to access data. In this regard, application program data 1930 is accessible by a user from any device, including a device which was not used to create assets 1940. This is achieved by synchronization engine 1932 that stores application program data 1930 in data storage unit 1912 and enables application program data 1930 to be available for access by the user or other users via any device. Before accessing application program data 1930 by the user from any other device or by any other user, the user or the other user may need to provide login details for authentication if not already logged in. In some cases, if the user or the other user are logged in, then a newly created asset or updates to application program data 1930 are provided in real time. Rights management engine 1936 is also called to determine whether the newly created asset or the updates can be provided to the other user or not. Workspace data 1956 enables synchronization engine 1932 to provide a same workspace configuration to the user on any other device or to the other user based on rights management data 1938.

In various embodiments, various types of synchronization can be achieved. For example, the user can pick a font or a color from user device 1902A using a first application program and can use the font or the color in a second application program on any other device. If the user shares the font or the color with other users, then the other users can also use the font or the color. Such synchronization generally happens in real time. Similarly, synchronization of any type of application program data 1930 can be performed.

In some embodiments, user interaction with applications 1904 is tracked by application analytics engine 1958 and stored as application analytics data 1960. Application analytics data 1960 includes, for example, usage of a tool, usage of a feature, usage of a workflow, usage of assets 1940, and the like. Application analytics data 1960 can include the usage data on a per user basis and can also include the usage data on a per tool basis or per feature basis or per workflow basis or any other basis. Application analytics engine 1958 embeds a piece of code in applications 1904 that enables the application to collect the usage data and send it to application analytics engine 1958. Application analytics engine 1958 stores the usage data as application analytics data 1960 and processes application analytics data 1960 to draw meaningful output. For example, application analytics engine 1958 can draw an output that the user uses "Tool 4" a maximum number of times. The output of application analytics engine 1958 is used by personalization engine 1962 to personalize a tool menu for the user to show "Tool 4" on top. Other types of personalization can also be performed based on application analytics data 1960. In addition, personalization engine 1962 can also use workspace data 1956 or user data 1918 including user preferences to personalize one or more application programs 1928 for the user.

In some embodiments, application analytics data 1960 includes data indicating status of a project of the user. For example, if the user was preparing an article in a digital publishing application and what was left was publishing the prepared article at the time the user quit the digital publishing application, then application analytics engine 1958 tracks the state. Now when the user next opens the digital publishing application on another device, then the user is indicated and the state and options are provided to the user for publishing using the digital publishing application or any other application. In addition, while preparing the article, a recommendation can also be made by synchronization engine 1932 to incorporate some of other assets saved by the user and relevant for the article. Such a recommendation can be generated using one or more engines, as described herein.

Creative apparatus 1908 also includes community engine 1964 which enables creation of various communities and collaboration among the communities. A community, as described herein, includes a group of users that share at least one common interest. The community can be closed, i.e., limited to a number of users or can be open, i.e., anyone can participate. The community enables the users to share each other's work and comment or like each other's work. The work includes application program data 1930. Community engine 1964 stores any data corresponding to the community, such as work shared on the community and comments or likes received for the work as community data 1966. Community data 1966 also includes notification data and is used for notifying other users by the community engine in case of any activity related to the work or new work being shared. Community engine 1964 works in conjunction with synchronization engine 1932 to provide collaborative workflows to the user. For example, the user can create an image and can request for some expert opinion or expert editing. An expert user can then either edit the image as per the user liking or can provide expert opinion. The editing and providing of the expert opinion by the expert is enabled using community engine 1964 and synchronization engine 1932. In collaborative workflows, a plurality of users is assigned different tasks related to the work.

Creative apparatus 1908 also includes marketplace engine 1968 for providing marketplace to one or more users. Marketplace engine 1968 enables the user to offer an asset for selling or using. Marketplace engine 1968 has access to assets 1940 that the user wants to offer on the marketplace. Creative apparatus 1908 also includes search engine 1970 to enable searching of assets 1940 in the marketplace. Search engine 1970 is also a part of one or more application programs 1928 to enable the user to perform search for assets 1940 or any other type of application program data 1930. Search engine 1970 can perform a search for an asset using metadata 1942 or the file.

Creative apparatus 1908 also includes document engine 1972 for providing various document related workflows, including electronic or digital signature workflows, to the user. Document engine 1972 can store documents as assets 1940 in data storage unit 1912 or can maintain a separate document repository (not shown in FIG. 19).

In accordance with embodiments of the present invention, application programs 1928 include an image editing application that facilitates automatic synthesis of content-aware fills. In these embodiments, the image editing application is provided to user device 1902A (e.g., as application 1904N) such that the image editing application operates via the user device. In another embodiment, one or more of a user interface (e.g., user interface 1903A), a patch validity component (e.g., patch validity component 1905A) and/or a patch-based synthesizer (e.g., patch-based synthesizer 1907A) are provided as an add-on or plug-in to an application such as an image editing application, as further described with reference to FIG. 1 above. These configurations are merely exemplary, and other variations for providing storyboarding software functionality are contemplated within the present disclosure.

It is to be appreciated that the engines and working of the engines are described as examples herein, and the engines can be used for performing any step in providing digital experience to the user.

Exemplary Operating Environment

Figure 20:
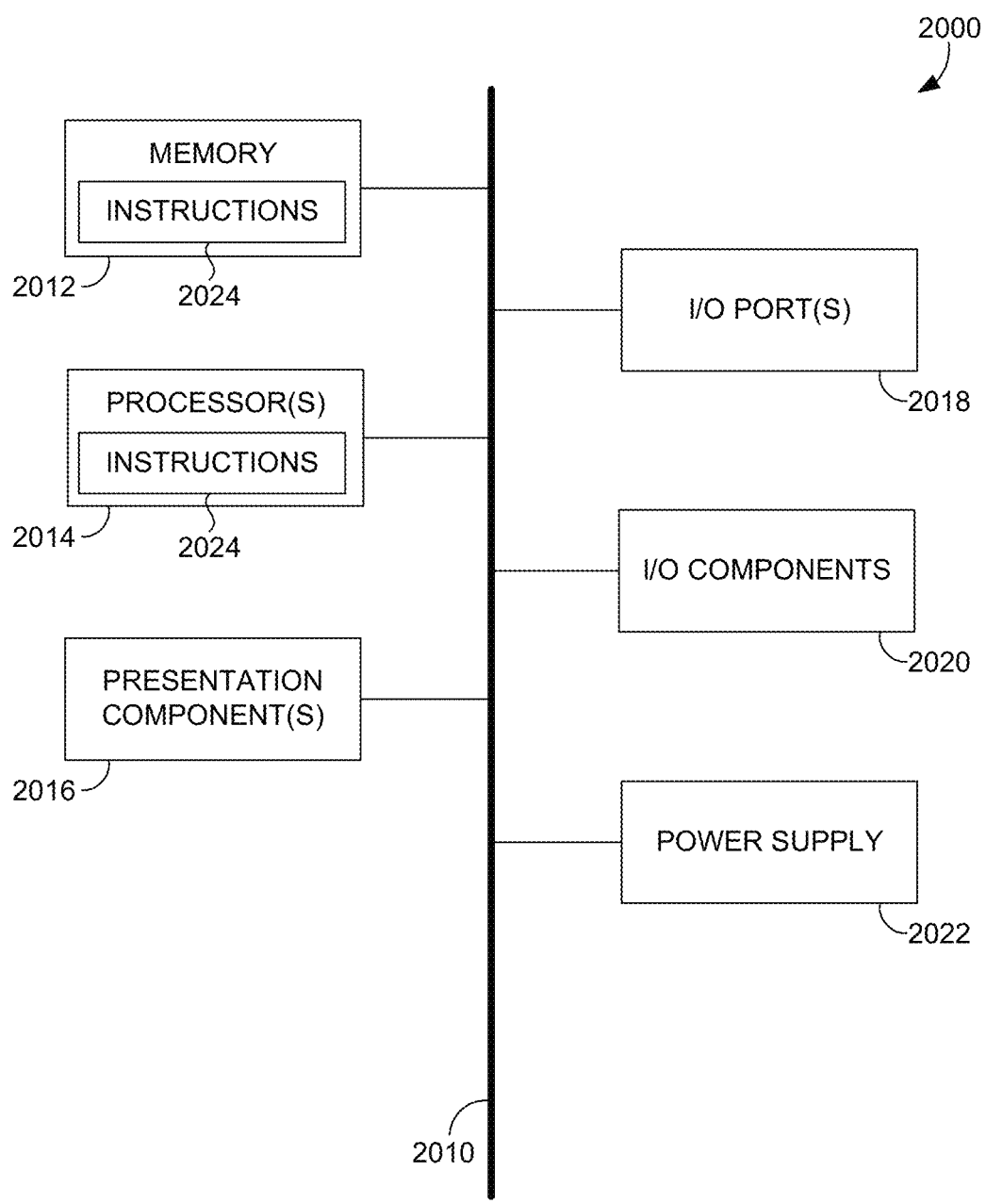
FIG. 20 is a block diagram of an exemplary computing environment suitable for use in implementing embodiments of the present invention.

Having described an overview of embodiments of the present invention, an exemplary operating environment in which embodiments of the present invention may be implemented is described below in order to provide a general context for various aspects of the present invention. Referring now to FIG. 20 in particular, an exemplary operating environment for implementing embodiments of the present invention is shown and designated generally as computing device 2000. Computing device 2000 is but one example of a suitable computing environment and is not intended to suggest any limitation as to the scope of use or functionality of the invention. Neither should computing device 2000 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 20, computing device 2000 includes bus 2010 that directly or indirectly couples the following devices: memory 2012, one or more processors 2014, one or more presentation components 2016, input/output (I/O) ports 2018, input/output components 2020, and illustrative power supply 2022. Bus 2010 represents what may be one or more busses (such as an address bus, data bus, or combination thereof). Although the various blocks of FIG. 20 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 20 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 20 and reference to "computing device."

Computing device 2000 typically includes a variety of computer-readable media. Computer-readable media can be any available media that can be accessed by computing device 2000 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 2000. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 2012 includes computer-storage media in the form of volatile and/or nonvolatile memory. The memory may be removable, non-removable, or a combination thereof. Exemplary hardware devices include solid-state memory, hard drives, optical-disc drives, etc. Computing device 2000 includes one or more processors that read data from various entities such as memory 2012 or I/O components 2020. Presentation component(s) 2016 present data indications to a user or other device. Exemplary presentation components include a display device, speaker, printing component, vibrating component, etc.

I/O ports 2018 allow computing device 2000 to be logically coupled to other devices including I/O components 2020, some of which may be built in. Illustrative components include a microphone, joystick, game pad, satellite dish, scanner, printer, wireless device, etc. The I/O components 2020 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 2000. Computing device 2000 may be equipped with depth cameras, such as stereoscopic camera systems, infrared camera systems, RGB camera systems, touchscreen technology, and combinations of these, for gesture detection and recognition. Additionally, the computing device 2000 may be equipped with accelerometers or gyroscopes that enable detection of motion. The output of the accelerometers or gyroscopes may be provided to the display of computing device 2000 to render immersive augmented reality or virtual reality.

Embodiments described herein support automatically synthesizing a content-aware fill. The components described herein refer to integrated components of an automatic fill synthesis system. The integrated components refer to the hardware architecture and software framework that support functionality using the automatic fill synthesis system. The hardware architecture refers to physical components and interrelationships thereof and the software framework refers to software providing functionality that can be implemented with hardware embodied on a device.

The end-to-end software-based automatic fill synthesis system can operate within the automatic fill synthesis system components to operate computer hardware to provide automatic fill synthesis system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the automatic fill synthesis system components can manage resources and provide services for the automatic fill synthesis system functionality. Any other variations and combinations thereof are contemplated with embodiments of the present invention.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. A computer-implemented method comprising:
receiving, by a user interface, parameters of a content-aware fill for a hole in an original image;
triggering an iterative process to use the parameters to synthesize successive resolutions of a multi-scale fill solution for the content-aware fill from patches sampled from a sampling region of the original image;
receiving, during a break in the iterative process prior to completion of a full resolution of the multi-scale fill solution, a particular resolution of the multi-scale fill solution; and
causing a presentation in the user interface of the particular resolution of the multi-scale fill solution as a preview of the content-aware fill.

2. The method of claim 1, wherein the parameters include a user-specified preview resolution or preview dimension, and wherein the break is upon completion of a particular iteration of the iterative process that generates the particular resolution of the multi-scale fill solution within a threshold of the user-specified preview resolution or preview dimension.

3. The method of claim 1, further comprising, in response to receiving an instruction to resume the iterative process, triggering the iterative process to synthesize at least one subsequent resolution of the multi-scale fill solution.

4. The method of claim 1, further comprising:
receiving, during the break in the iterative process, a change to the hole, the sampling region, or a parameter of eligible similarity transforms of candidate patches for the content-aware fill; and
triggering the iterative process to synthesize at least one resolution of the multi-scale fill solution based on the change.

5. The method of claim 1, further comprising:
receiving, during the break in the iterative process, an indication to zoom in to the preview;
triggering the iterative process to synthesize a higher resolution of the multi-scale fill solution;
receiving the higher resolution of the multi-scale fill solution, during a subsequent break in the iterative process prior to completion of the full resolution of the multi-scale fill solution; and
causing a presentation in the user interface of the higher resolution of the multi-scale fill solution as the preview of the content-aware fill.

6. The method of claim 1, further comprising:
receiving, during the break in the iterative process, an indication to zoom out of the preview;
retrieving a lower resolution of the multi-scale fill solution that was cached prior to the break; and
causing a presentation in the user interface of the lower resolution of the multi-scale fill solution as the preview of the content-aware fill.

7. One or more computer storage media storing computer-useable instructions that, when used by one or more computing devices, cause the one or more computing devices to perform operations comprising:
executing an iterative process to synthesize a target image to fill a hole in an original image from patches sampled from a sampling region of the original image, wherein the iterative process is configured to generate successive resolutions of the target image;
prior to the completion of the iterative process, breaking the iterative process after a particular iteration that generates a particular resolution of the target image; and
providing the particular resolution of the target image for presentation as a preview of the target image.

8. The one or more computer storage media of claim 7, wherein the breaking is based on a determination that the target image is within a threshold of a user-specified preview resolution or preview dimension.

9. The one or more computer storage media of claim 7, wherein the breaking is based on detection of a user input changing the hole, the sampling region, or a parameter of eligible similarity transforms of candidate patches for the target image.

10. The one or more computer storage media of claim 7, wherein the breaking is upon completion of the particular iteration, the operations further comprising, in response to receiving an instruction to resume the iterative process, synthesizing at least one subsequent resolution of the target image by executing a subsequent iteration of the iterative process.

11. The one or more computer storage media of claim 7, the operations further comprising:
receiving, prior to resuming the iterative process, a change to the hole, the sampling region, or a parameter of eligible similarity transforms of candidate patches for the target image; and
synthesizing at least one resolution of the target image, based on the change, utilizing at least one computation of the iterative process that was cached prior to the breaking.

12. The one or more computer storage media of claim 7, the operations further comprising:
receiving, prior to resuming the iterative process, an indication to zoom in to the preview;
resuming execution of the iterative process from where the iterative process was broken to synthesize a higher resolution of the target image; and
providing the higher resolution of the target image for presentation as the preview of the target image.

13. The one or more computer storage media of claim 7, the operations further comprising:
receiving, prior to resuming the iterative process, an indication to zoom out of the preview;
retrieving a lower resolution of the target image that was cached prior to the breaking of the iterative process; and
providing the lower resolution of the target image for presentation as the preview of the target image.

14. The one or more computer storage media of claim 7, the operations further comprising providing each resolution of the successive resolutions of the target image, upon completion of a corresponding iteration of the iterative process, for presentation as a gradually updating preview of the target image.

15. A computer system comprising:
one or more hardware processors and memory configured to provide computer program instructions to the one or more hardware processors;
an interface component configured to use the one or more hardware processors to:
trigger an iterative process configured to synthesize successive resolutions of a multi-scale fill solution for a target image to fill a hole in an original image from patches sampled from a sampling region of the original image;
receive, prior to completion of a full resolution of the multi-scale fill solution, a particular resolution of the multi-scale fill solution generated by a particular iteration of the iterative process; and cause a presentation of the particular resolution of the multi-scale fill solution as a preview of the target image in a results panel of a user interface.

16. The computer system of claim 15, wherein the interface component is configured to cause the presentation of the particular resolution of the multi-scale fill solution during a break of the iterative process occurring upon completion of an iteration that generates the particular resolution of the multi-scale fill solution within a threshold of a user-specified preview resolution or preview dimension.

17. The computer system of claim 15, wherein the interface component is configured to receive a user input changing the hole, the sampling region, or a parameter of eligible similarity transforms of candidate patches for the target image, and in response, cause a break of the iterative process.

18. The computer system of claim 15, wherein the interface component is configured to:
receive, during a break in the iterative process, a user input indicating a change to the hole, the sampling region, or a parameter of eligible similarity transforms of candidate patches for the target image; and
trigger the iterative process to synthesize at least one resolution of the target image based on the change.

19. The computer system of claim 15, wherein the interface component is configured to:
receive, during a break in the iterative process, an indication to zoom in to the preview;
trigger the iterative process to synthesize a higher resolution of the target image;
receive the higher resolution of the target image during a subsequent break in the iterative process prior to completion of the full resolution of the target image; and
cause a presentation of the higher resolution of the target image in the results panel of the user interface.

20. The computer system of claim 15, wherein the interface component is configured to:
receive, during a break in the iterative process, an indication to zoom out of the preview;
retrieve a lower resolution of the target image that was cached prior to the break; and
cause a presentation of the lower resolution of the target image in the results panel of the user interface.

* * * * *